United States Patent
Abbaszadeh et al.

(10) Patent No.: US 10,819,725 B2
(45) Date of Patent: Oct. 27, 2020

(54) RELIABLE CYBER-THREAT DETECTION IN RAPIDLY CHANGING ENVIRONMENTS

(71) Applicant: General Electric Company, Schenectady, NY (US)

(72) Inventors: Masoud Abbaszadeh, Clifton Park, NY (US); Lalit Keshav Mestha, North Colonie, NY (US)

(73) Assignee: GENERAL ELECTRIC COMPANY, Schenectady ( * ) Notice: Subject to any disclaimer, the term of this patent is extended or adjusted under 35 U.S.C. 154(b) by 264 days.

(21) Appl. No.: 15/964,644

(22) Filed: Apr. 27, 2018

(65) Prior Publication Data

US 2019/0222596 A1    Jul. 18, 2019

Related U.S. Application Data

(60) Provisional application No. 62/618,961, filed on Jan. 18, 2018.

(51) Int. Cl.
*G06F 21/00* (2013.01)
*H04L 29/06* (2006.01)
*G06F 21/55* (2013.01)

(52) U.S. Cl.
CPC .......... *H04L 63/1425* (2013.01); *G06F 21/55* (2013.01); *G06F 21/552* (2013.01); *G06F 21/554* (2013.01)

(58) Field of Classification Search
CPC ........ G06F 21/50; G06F 21/55; G06F 21/552; G06F 21/554; G06F 21/577; H04L 63/14;
(Continued)

(56) References Cited

U.S. PATENT DOCUMENTS 10,205,733 B1 *  2/2019  Park ............... H04L 63/1408
2008/0276111 A1 * 11/2008  Jacoby ................. G06F 21/55
                                                          713/340

(Continued)

FOREIGN PATENT DOCUMENTS

CN          107491057 A        12/2017

OTHER PUBLICATIONS

P, Ongsakorn et al., "Cyber Threat Trees for Large System threat Cataloging and Analysis", 4th Annual IEEE Systems Conference, Apr. 5-8, 2010, http://ieeexplore.ieee.org/abstract/document/5482351/, 6pgs.

(Continued)

*Primary Examiner* — Edward Zee
(74) *Attorney, Agent, or Firm* — Buckley, Maschoff & Talwalkar LLC

(57) ABSTRACT

In some embodiments, a plurality of monitoring nodes each generate a series of current monitoring node values over time that represent a current operation of the industrial asset. An attack detection computer platform may receive the series of current monitoring node values and generate a set of current feature vectors including a current feature for capturing transients (e.g., local transients and/or global transients). The attack detection computer platform may also access an attack detection model having at least one decision boundary that was created using at least one of a set of normal feature vectors and/or a set of attacked feature vectors. The attack detection model may then be executed such that an attack alert signal is transmitted by the attack detection computer platform, when appropriate, based on the set of current feature vectors (including the current feature to capture transients) and the at least one decision boundary.

21 Claims, 21 Drawing Sheets

(58) Field of Classification Search
CPC ............. H04L 63/1416; H04L 63/1433; H04L 63/1441
See application file for complete search history.

(56) References Cited

U.S. PATENT DOCUMENTS

| | | | |
|---|---|---|---|
| 2009/0198474 | A1 | 8/2009 | Fritz et al. |
| 2010/0317420 | A1 | 12/2010 | Hoffberg |
| 2012/0284791 | A1 | 11/2012 | Miller et al. |
| 2015/0378339 | A1 | 12/2015 | Ji |
| 2016/0300227 | A1 | 10/2016 | Subhedar et al. |
| 2016/0366170 | A1 | 12/2016 | Bell |
| 2017/0085588 | A1 | 3/2017 | Laidlaw et al. |
| 2017/0220801 | A1 | 8/2017 | Stockdale et al. |
| 2017/0310690 | A1 | 10/2017 | Mestha et al. |
| 2017/0359366 | A1 | 12/2017 | Bushey et al. |

OTHER PUBLICATIONS

Hyun, Kyoo Park et al., "Cyber Situational Awareness Enhancement with Regular Expressions and an Evaluation Methodology", Military Communications Conference (MILCOM), Oct. 23-25, 2017, http://ieeexplore.ieee.org/document/8170859/, (pp. 406-411, 6 total pages).

H, Abdo et al., "A Safety/Security Risk Analysis Approach of Industrial Control Systems: A Cyber Bowtie—Combining New Version of Attack Tree with Bowtie Analysis", Computers & Security, vol. 72, Jan. 2018, DOI: 10.1016/j.cose.2017.09.004, https://www.sciencedirect.com/science/article/pii/S0167404817301931, (pp. 175-195, 21 total pages).

"Communication—European Search Report" for European Application No. 18204057.6 dated Apr. 16, 2019, 7 pp.

* cited by examiner

| INDUSTRIAL ASSET IDENTIFIER 2102 | INDUSTRIAL ASSET DESCRIPTION 2104 | FEATURE TO CAPTURE TRANSIENTS 2106 | TYPE 2108 | DESCRIPTION 2110 | STATUS 2112 |
|---|---|---|---|---|---|
| IA_2001 | GAS TURBINE | F_101 | LOCAL | DERIVATIVE | NORMAL |
| IA_2001 | GAS TURBINE | F_102 | GLOBAL | JACOBIAN | ATTACKED |
| IA_2001 | GAS TURBINE | F_103 | LOCAL | HESSIAN | NORMAL |
| IA_2002 | POWER LINE | F_104 | LOCAL | EIGENVALUE | NORMAL |

FIG. 21

RELIABLE CYBER-THREAT DETECTION IN RAPIDLY CHANGING ENVIRONMENTS

CROSS-REFERENCE TO RELATED APPLICATIONS

The present application claims the benefit of U.S. Provisional Patent Application No. 62/818,962 entitled "RELIABLE CYBER-THREAT DETECTION IN RAPIDLY CHANGING ENVIRONMENTS" and filed on Jan. 18, 2018. The entire contents of that application is incorporated herein by reference.

This invention was made with Government support under contract number DE-OE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or EVEN catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect an industrial asset from cyber-attacks in an automatic and accurate manner even when attacks percolate through the IT and OT layers and directly harm control systems.

SUMMARY

According to some embodiments, a plurality of monitoring nodes each generate a series of current monitoring node values over time that represent a current operation of the industrial asset. An attack detection computer platform may receive the series of current monitoring node values and generate a set of current feature vectors including a current feature for capturing transients (e.g., local transients and/or global transients). The attack detection computer platform may also access an attack detection model having at least one decision boundary that was created using at least one of a set of normal feature vectors and/or a set of attacked feature vectors. The attack detection model may then be executed such that an attack alert signal is transmitted by the attack detection computer platform, when appropriate, based on the set of current feature vectors (including the current feature to capture transients) and the at least one decision boundary.

Some embodiments comprise: means for receiving a series of current monitoring node values, from a plurality of monitoring nodes, that represent a current operation of an industrial asset; means for generating a set of current feature vectors including a current feature for capturing local transients and a current feature for capturing global transients; means for accessing an attack detection model having at least one decision boundary created using a set of normal feature vectors and/or a set of attacked feature vectors; means for executing the attack detection model; and means for transmitting an attack alert signal based on the set of current feature vectors and the at least one decision boundary Some technical advantages of some embodiments disclosed herein are improved systems and methods to protect one or more industrial assets from cyber-attacks in an automatic and accurate manner.

BRIEF DESCRIPTION OF THE DRAWINGS

FIG. 21 is portion of a tabular industrial asset database in accordance with some embodiments.

DETAILED DESCRIPTION

Figure 1:
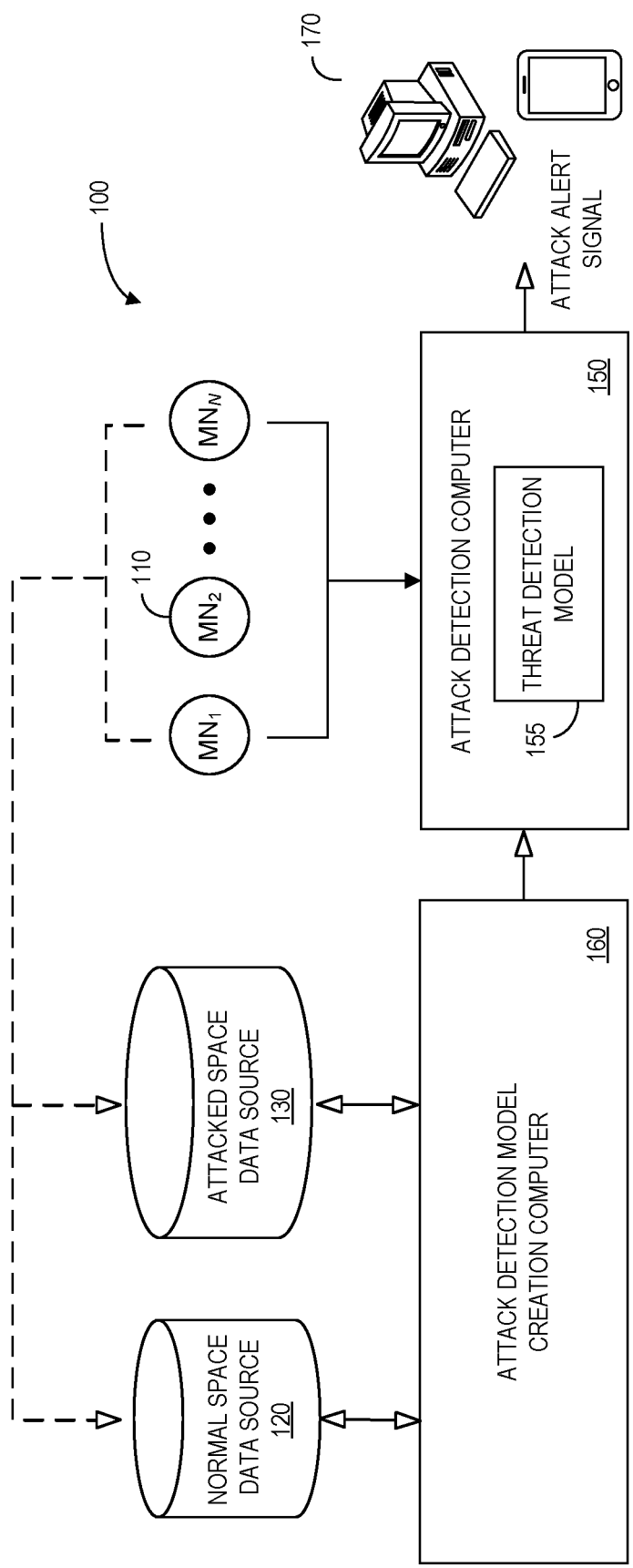
FIG. 1 is a high-level block diagram of a system that may be provided in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein may provide a system and method for reliable cyber-threat detection in an industrial control system or an enterprise asset that contains rapid transients during normal operation. Given a plurality of threat monitoring nodes (e.g., sensor, actuator and controller nodes), a threat detection decision boundary is built in the feature space by incorporating special transient capturing features, augmented to the conventional base features extracted from the time-domain signals of the monitoring nodes. The transient capturing features may be pre-possessed for de-noising and classification decision boundary may be made more robust by anti-jittering. The resulting system may have low real-time computation cost and outperform current threat/anomaly detection methods by having lower false alarm rate during normal rapid transients and faster detection time during cyber incidents.

Some embodiments described herein are associated with time series data from one or more monitoring nodes from a physical (i.e., industrial or enterprise) asset and provides a reliable cyber-threat detection with low false positive rate during rapid operational transitions. Monitoring nodes may include, for example, sensors, actuators, and/or controller nodes. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. The features may be computed at the local level (associated with each monitoring node) and/or the global level (associated with all the monitoring nodes, i.e., the whole asset). The time-domain values of the nodes or their extracted features may be, according to some embodiments, normalized for better numerical conditioning.

FIG. 1 is a high-level architecture of a system 100 in accordance with some embodiments. The system 100 may include monitoring node sensors 110 $MN_1$ through $MN_N$, a "normal space" data source 120, and an "attacked space" data source 130. The normal space data source 120 might store, for each of the plurality of monitoring nodes 110, a series of normal values over time that represent normal operation of an industrial asset (e.g., generated by a model or collected from actual sensor data as illustrated by the dashed line in FIG. 1). The attacked space data source 130 might store, for each of the monitoring nodes 110, a series of attacked values that represent a threatened operation of the industrial asset (e.g., when the system is experiencing a cyber-attack).

Information from the normal space data source 110 and the attacked space data source 120 may be provided to an attack detection model creation computer 160 that uses this data to create a decision boundary (that is, a boundary that separates normal behavior from threatened behavior). The decision boundary may then be used by an attack detection computer 150 executing a threat detection model 155. The threat detection model 155 may, for example, monitor streams of data from the monitoring nodes 110 comprising data from sensor nodes, actuator nodes, and/or any other critical monitoring nodes (e.g., sensor nodes $MN_1$ through $MN_N$) and automatically output an attack alert signal to one or more remote monitoring devices 170 when appropriate (e.g., for display to an operator). As used herein, the term "automatically" may refer to, for example, actions that can be performed with little or no human intervention. According to some embodiments, information about detected threats may be transmitted back to an industrial asset control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The attack detection model creation computer 160 may store information into and/or retrieve information from various data stores, such as the normal space data source 120 and/or the attacked space data source 130. The various data sources may be locally stored or reside remote from the attack detection model creation computer 160. Although a single attack detection model creation computer 160 is shown in FIG. 1, any number of such devices may be included. Moreover, various devices described herein might be combined according to embodiments of the present invention. For example, in some embodiments, the attack detection model creation computer 160 and one or more data sources 120, 130 might comprise a single apparatus. The attack detection model creation computer 160 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., attack detection trigger levels) and/or provide or receive automatically generated recommendations or results from the attack detection model creation computer 160 and/or attack detection computer 150.

Figure 2:
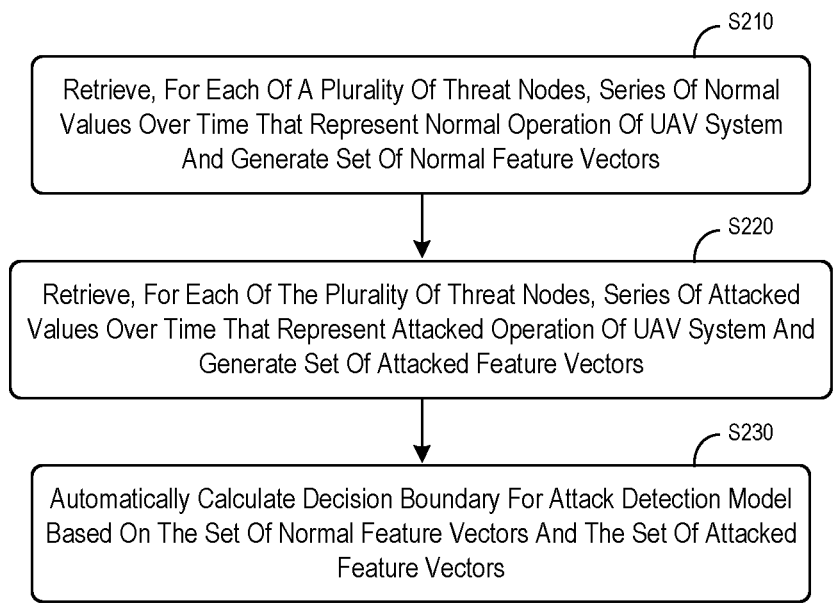
FIG. 2 is a model creation method according to some embodiments.
Figure 4:
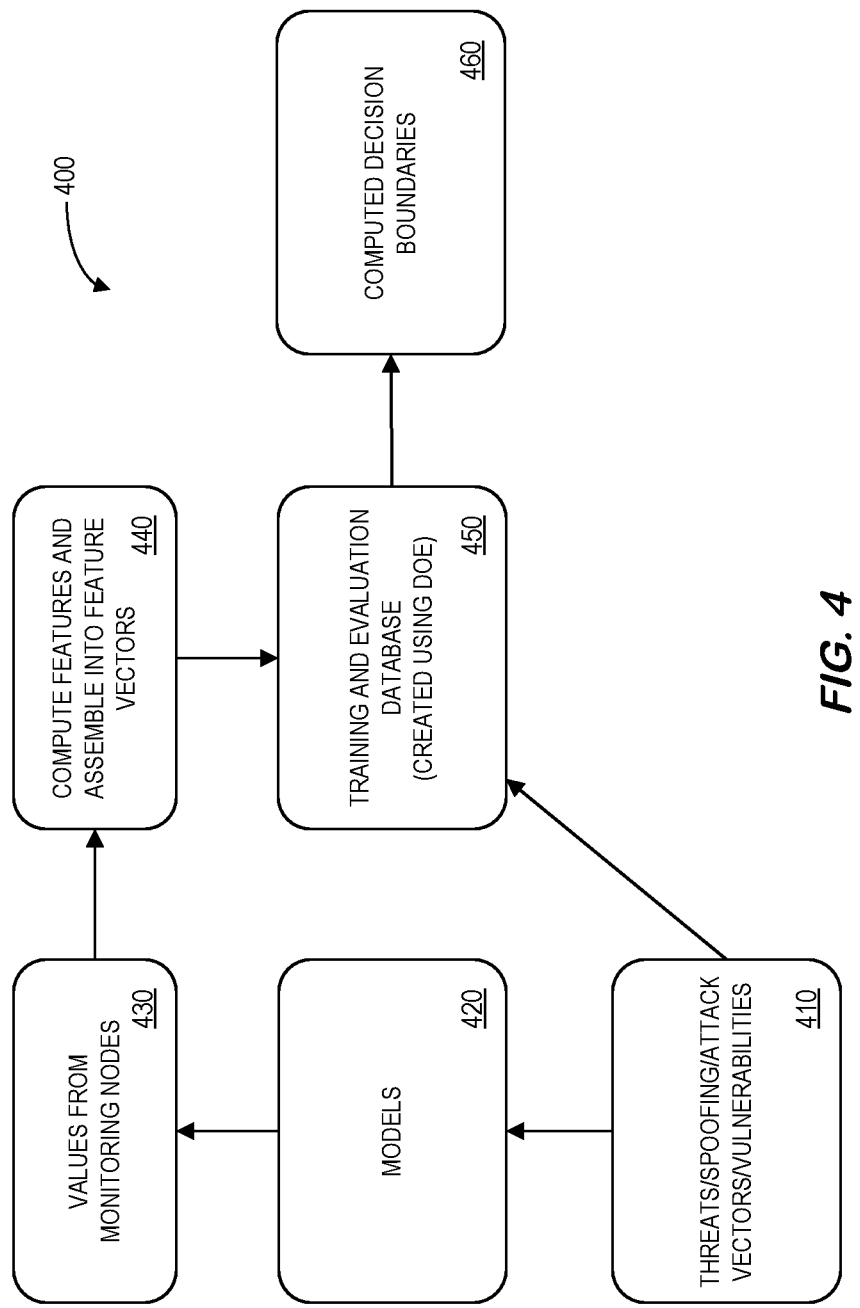
FIG. 4 illustrates an off-line process in accordance with some embodiments.

For example, FIG. 2 illustrates a model creation method that might be performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may retrieve, for each of a plurality of threat nodes (e.g., monitoring nodes), a series of normal values over time that represent normal operation of the industrial asset and a set of normal feature vectors may be generated. Similarly, at S220 the system may retrieve, for each of the plurality of threat nodes, a series of attacked values over time that represent an attacked operation of the industrial asset and a set of attacked feature vectors may be generated. The series of normal and/or attacked values might be obtained, for example, by running Design of Experiments ("DoE") on an industrial asset. At S230, a decision boundary may be automatically calculated for an attack detection model based on the set of normal feature vectors and the set of attacked feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space. In addition, note that the attack detection model might be associated with the decision boundary, feature mapping functions, and/or feature parameters.

Figure 3:
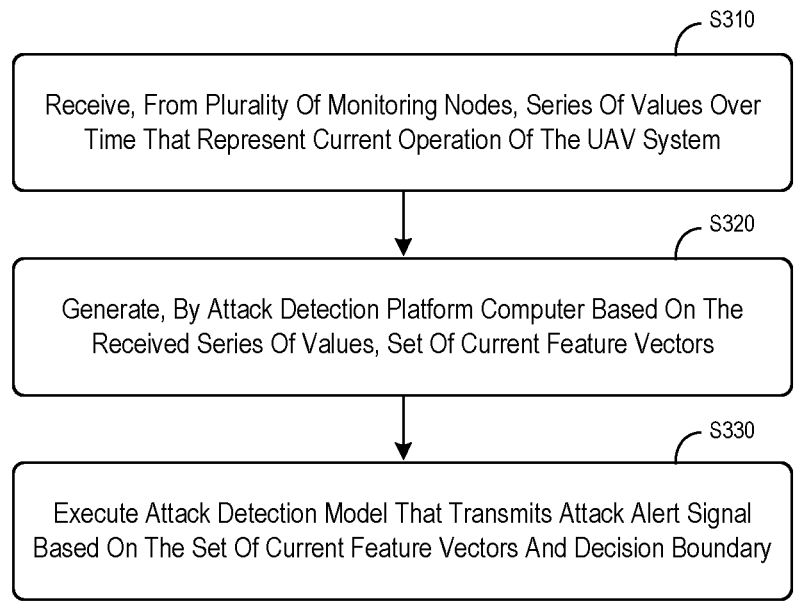
FIG. 3 is threat alert method according to some embodiments.

The decision boundary can then be used to detect cyber-attacks. For example, FIG. 3 is an attack alert method according to some embodiments. At S310, the system may receive, from a plurality of monitoring nodes, a series of current values over time that represent a current operation of the industrial asset. At S320, an attack detection platform computer may then generate, based on the received series of current values, a set of current feature vectors. At S330, an attack detection model may be executed to transmit an attack alert signal based on the set of current feature vectors and a decision boundary when appropriate (e.g., when a cyber-attack is detected). According to some embodiments, one or more response actions may be performed when an attack alert signal is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

FIG. 4 illustrates an off-line boundary creation process 400 in accordance with some embodiments. Information about threats, spoofing, attack vectors, vulnerabilities, etc. 410 may be provided to models 420 and/or a training and evaluation database 450 created using DoE techniques. The models 420 may, for example, simulate data 430 from monitoring nodes to be used to compute features that are assembled into a feature vector 440 to be stored in the training and evaluation database 450. The data in the training and evaluation database 450 may then be used to compute decision boundaries 460 to distinguish between normal operation and attacked operation. According to some embodiments, the process 400 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 420 may comprise high-fidelity models that can be used to create a data set (e.g., a set that describes threat space as "levels of threat conditions in the system versus quantities from the threat nodes"). The data 430 from the threat nodes might be, for example, quantities that are captured for a length of from 60 to 80 seconds from sensor nodes, actuator nodes, and/or controller nodes (and a similar data set may be obtained for "levels of normal operating conditions in the system versus quantities from the threat nodes"). This process will result in data sets for "attack space" and "normal space." The 60 to 80 seconds long quantities may be used to compute features 440 using feature engineering to create feature vectors. These feature vectors can then be used to obtain a decision boundary that separates the data sets for threat space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 5:
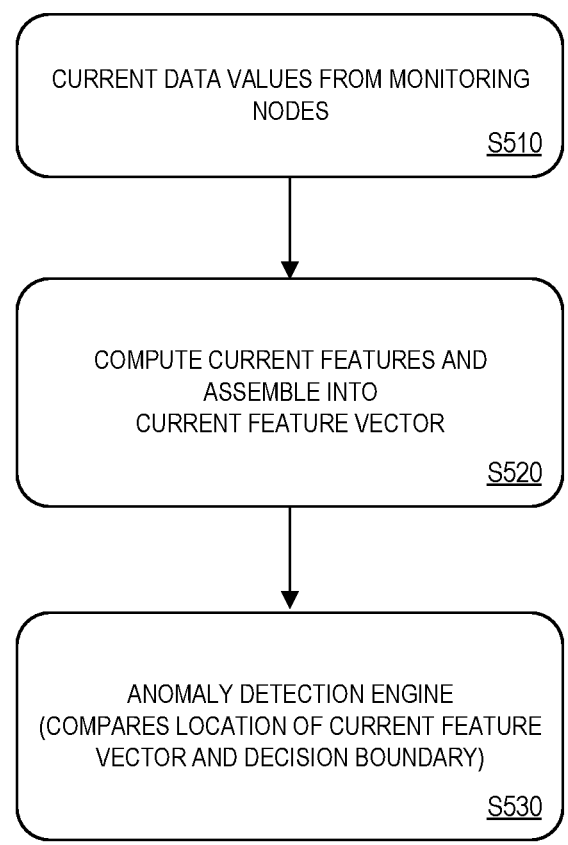
FIG. 5 illustrates a real-time process according to some embodiments.

FIG. 5 illustrates a real-time process to protect an industrial asset according to some embodiments. At S510, current data from monitoring nodes may be gathered (e.g., in batches of from 60 to 80 seconds). At S520, the system may compute features and form feature vectors. For example, the system might use weights from a principal component analysis as features. At S530, an anomaly detection engine may compare location of feature vectors to a decision boundary to make a determination (and output an alert signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 6:
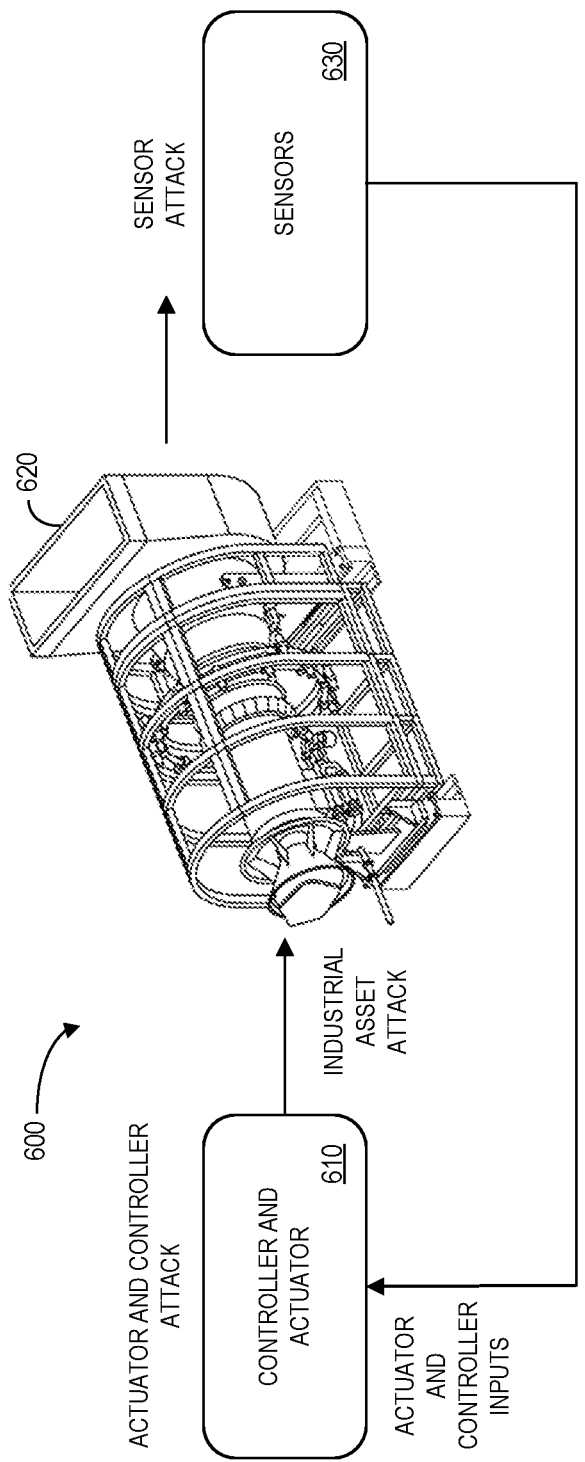
FIG. 6 is an example associated with an industrial asset engine in accordance with some embodiments.

FIG. 6 is an example 600 associated with an industrial asset in accordance with some embodiments. In particular, the example includes a controller and actuator portion 610 subject to actuator and controller attacks, a gas turbine portion 620 subject to state attacks, and sensors 930 subject to sensor attacks. By way of examples only, the sensors 630 might comprise physical and/or virtual sensors associated with temperatures, airflows, power levels, etc. The actuators might be associated with, for example, motors. By monitoring the information in the industrial asset, a threat detection platform may be able to detect cyber-attacks (e.g., using feature vectors and a decision boundary) that could potentially cause a large amount of damage.

Figure 7:
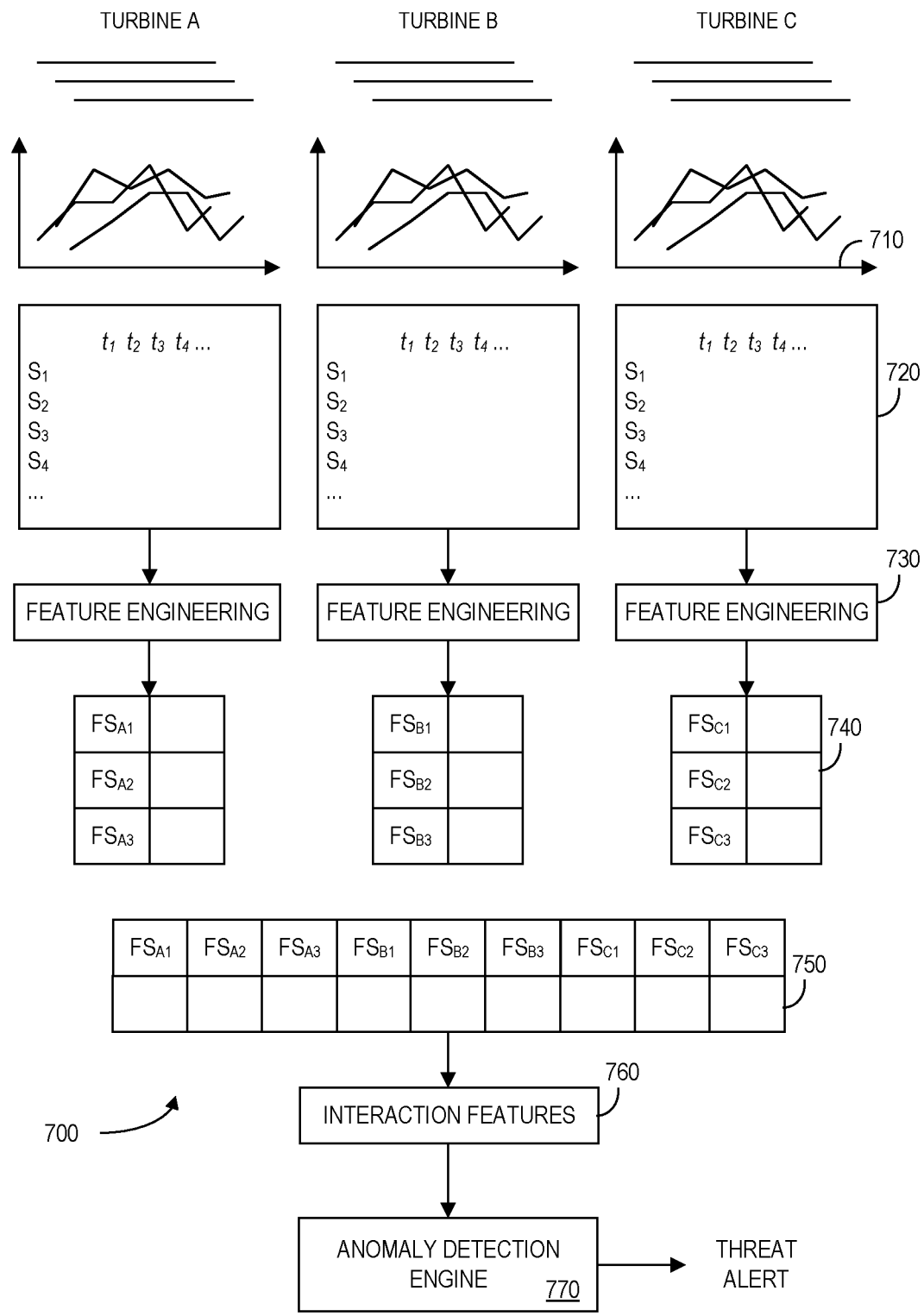
FIG. 7 is an example of a global threat protection system in accordance with some embodiments when multiple gas turbines are involved in a system.

FIG. 7 is an example of a global threat protection system 700 in accordance with some embodiments when multiple gas turbines are involved in a system. In particular, the system 700 includes three turbines (A, B, and C) and batches of values 710 from threat nodes are collected for each generated over a period of time (e.g., 60 to 80 seconds). According to some embodiments, the batches of values 710 from threat nodes overlap in time. The values 710 from threat nodes may, for example, be stored in a matrix 720 arranged by time ($t_1$, $t_2$, etc.) and by type of threat node ($S_1$, $S_5$, etc.). Feature engineering components 730 may use information in each matrix 720 to create a feature vector 740 for each of the three turbines (e.g., the feature vector 740 for turbine C might include $FS_{C1}$, $FS_{C2}$, etc.). The three feature vectors 740 may then be combined into a single global feature vector 750 for the system 700. Interaction features 760 may be applied (e.g., associated with A*B*C, A+B+C, etc.) and an anomaly detection engine 770 may compare the result with a decision boundary and output a threat alert signal when appropriate.

Figure 8:
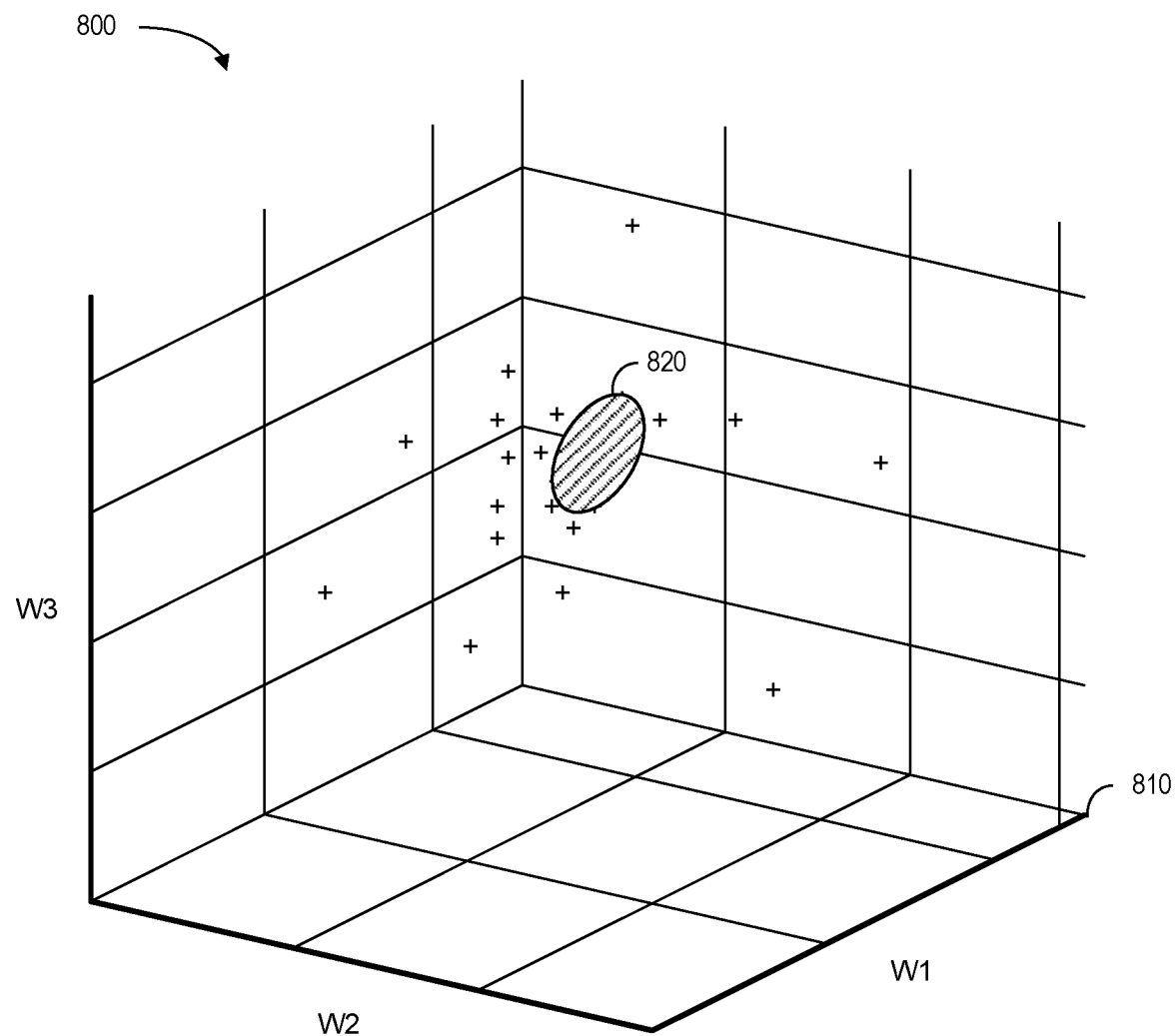
FIG. 8 illustrates three dimensions of sensor outputs in accordance with some embodiments.

FIG. 8 illustrates 800 three dimensions of threat node outputs in accordance with some embodiments. In particular, a graph 810 plots threat node outputs ("+") in three dimensions, such as dimensions associated with Principal Component Features ("PCF"): w1, w2, and w3. Moreover, the graph 810 includes an indication of a normal operating space decision boundary 820. Although a single contiguous boundary 820 is illustrated in FIG. 8, embodiments might be associated with multiple regions. Note that PCF information may be represented as weights in reduced dimensions. For example, data from each threat node may be converted to low dimensional features (e.g., weights). According to some embodiments, threat node data is normalized as follows:

$$S_{normalized}(k) = \frac{S_{nominal}(k) - S_{original}(k)}{\overline{S}_{nominal}}$$

where S stands for a threat node quantity at "k" instant of time. Moreover, output may then be expressed as a weighted linear combination of basis functions as follows:

$$S = S_0 + \sum_{j=1}^{N} w_i \Psi_j$$

where $S_0$ is the average threat node output with all threats, $w_j$ is the $j^{th}$ weight, and $\Psi_1$ is the $j^{th}$ basis vector. According to some embodiments, natural basis vectors are obtained using a covariance of the threat nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 9:
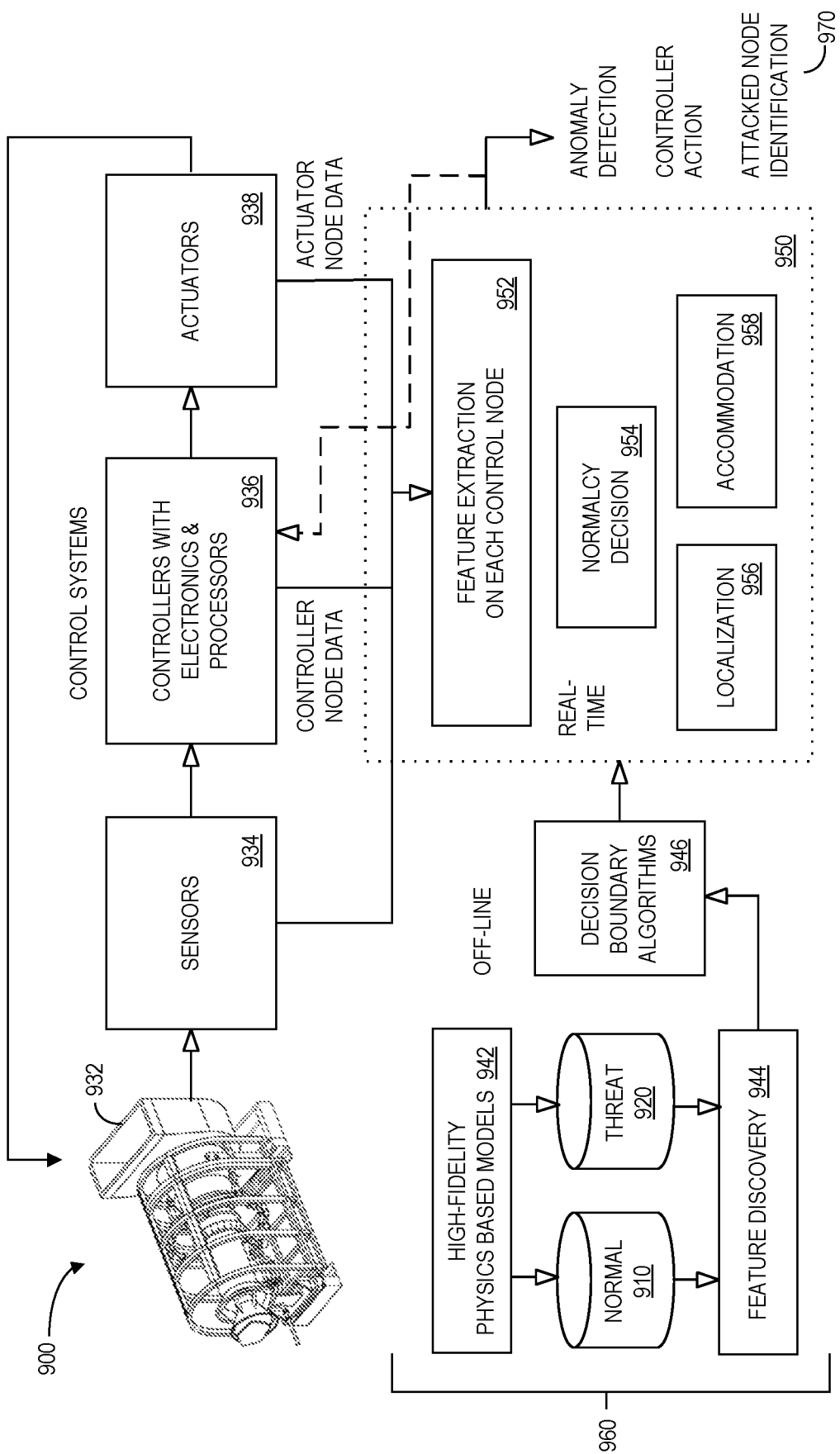
FIG. 9 is threat alert system according to some embodiments.

A cyber-attack detection and localization algorithm may process a real-time industrial asset signal data stream and then compute features (multiple identifiers) which can then be compared to the signal-specific decision boundary. A block diagram of a system 900 utilizing a signal-specific industrial asset cyber-attack detection and localization algorithm according to some embodiments is provided in FIG. 9. In particular, a gas turbine 932 provides information to sensors 934 which helps controllers with electronics and processors 936 adjust actuators 938. A threat detection system 960 may include one or more high-fidelity physics based models 942 associated with the turbine 932 to create normal data 910 and/or threat data 920. The normal data 910 and threat data 920 may be accessed by a feature discovery component 944 and processed by decision boundary algorithms 946 while off-line (e.g., not necessarily while the gas turbine 932 is operating). The decision boundary algorithms 946 may generate a threat model including decision boundaries for various monitoring nodes. Each decision boundary may separate two data sets in a high dimensional space which is constructed by running a binary classification algorithm, such as a support vector machine using the normal data 910 and threat data 920 for each monitoring node signal (e.g., from the sensors 934, controllers 936, and/or the actuators 938).

A real-time threat detection platform 950 may receive the boundaries along with streams of data from the monitoring nodes. The platform 950 may include a feature extraction on each monitoring node element 952 and a normalcy decision 954 with an algorithm to detect attacks in individual signals using signal specific decision boundaries, as well rationalize attacks on multiple signals, to declare which signals were attacked, and which became anomalous due to a previous attack on the system via a localization module 956. An accommodation element 958 may generate outputs 970, such as an anomaly decision indication (e.g., threat alert signal), a controller action, and/or a list of attacked monitoring nodes.

During real-time detection, contiguous batches of control signal data may be processed by the platform 950, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 938 and then manifested in the sensor 934 data. Attack assessments might be performed in a post decision module (e.g., the localization element 956) to isolate whether the attack is related to the sensor, controller, or actuator (e.g., indicating which part of the monitoring node). This may be done by individually monitoring, overtime, the location of the feature vector with respect to the hard decision boundary. For example, when a sensor 934 is spoofed, the attacked sensor feature vector will cross the hard decision boundary earlier than the rest of the vectors as described with respect to FIGS. 10 through 12. If a sensor 934 is declared to be anomalous, and a command to the auxiliary equipment is later determined to be anomalous, it may be determined that the original attack, such as signal spoofing, occurred on the sensor 934. Conversely, if the signal to the auxiliary equipment was determined to be anomalous first, and then later manifested in the sensor 934 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 10:
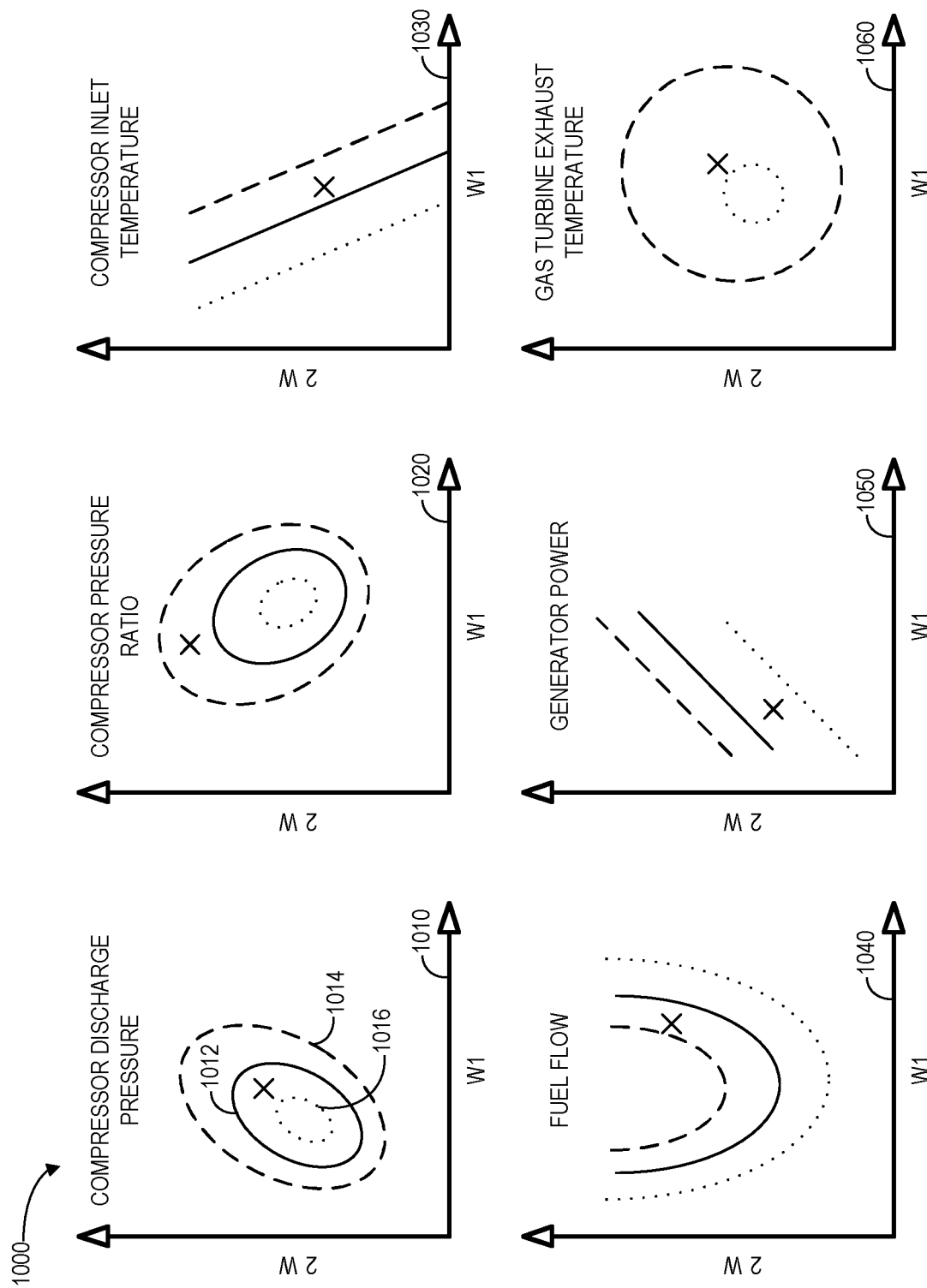
FIGS. 10, 11 and 12 illustrate boundaries and locations of feature vectors for various parameters in accordance with some embodiments.

FIG. 10 illustrates 1000 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data.

PCA might be one of the features that might be used by the algorithm to characterize the data, but note that other features could be leveraged.

A graph is provided for compressor discharge temperature 1010, compressor pressure ratio 1020, compressor inlet temperature 1030, fuel flow 1040, generator power 1050, and gas turbine exhaust temperature 1060. Each graph includes a hard boundary 1012 (solid curve), minimum boundary 1016 (dotted curve), and maximum boundary 1014 (dashed curve) and an indication associated with current feature location for each monitoring node parameter (illustrated with an "X" on the graph). As illustrated in FIG. 10, the current monitoring node location is between the minimum and maximum boundaries (that is, the "X" is between the dotted and dashed lines). As a result, the system may determine that the operation of the industrial asset control system is normal (and no threat is being detected indicating that the system is currently under attack).

Figure 11:
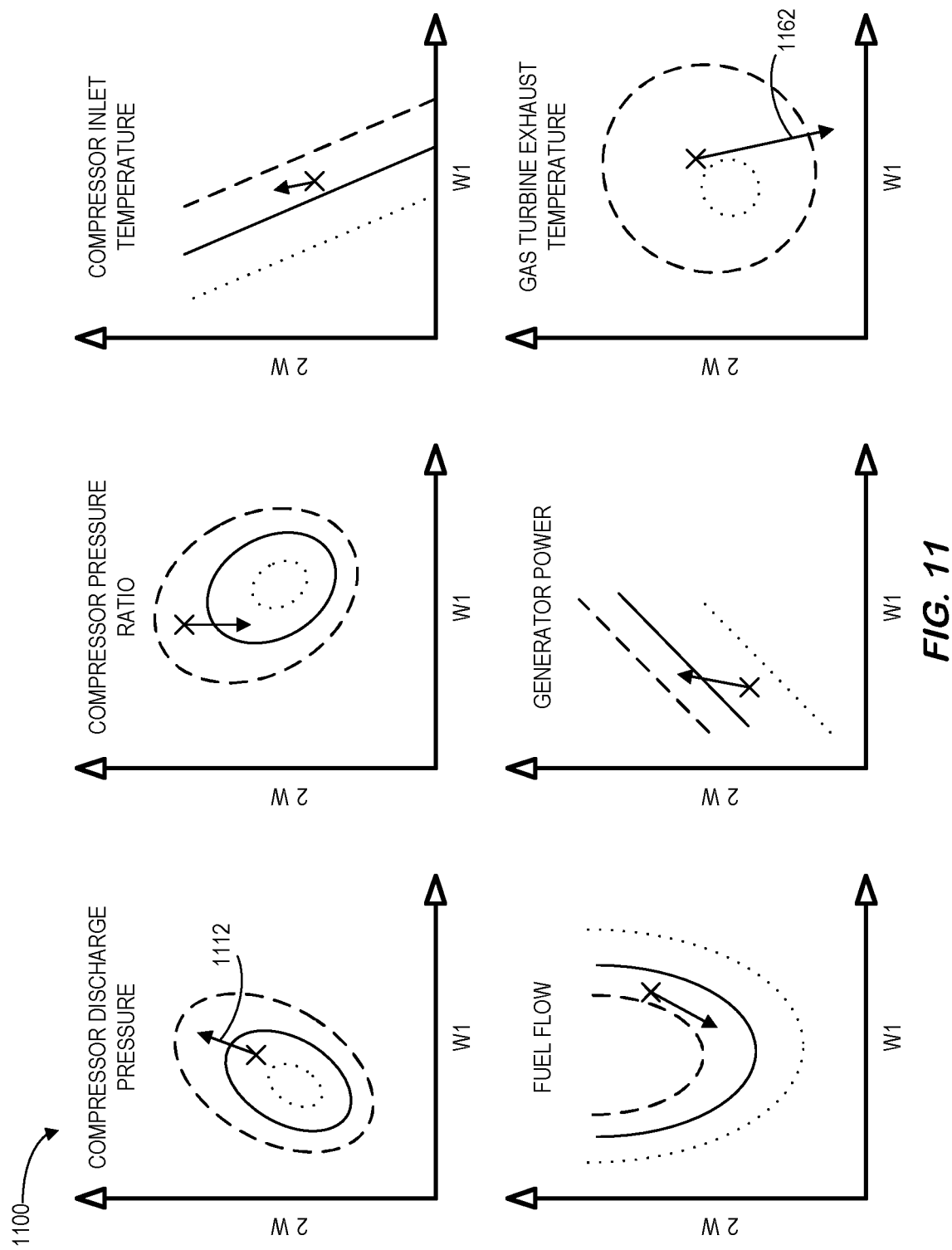

FIG. 11 illustrates 1100 subsequent boundaries and feature vectors for these parameters. Consider, for example, a feature vector movement 1112 for the compressor discharge pressure. Even though feature vector 1112 has moved, it is still within the maximum and minimum boundaries and, as a result, normal operation of that monitoring node may be determined. This is the case for the first five graphs in FIG. 11. In this example, a feature vector movement 1162 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 11 moves 1162 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 11, assume that the gas turbine exhaust temperature signal was attacked. This may cause the system to respond in such a way so as to put other signals into an abnormal state. This is illustrated 1200 in FIG. 12, where the attack has already been detected and now other signals shown to be abnormal. In particular, feature movement for the compressor discharge pressure 1212, compressor pressure ratio 1222, compressor inlet temperature 1232, and fuel flow 1242 have all become abnormal (joining the feature vector for the gas turbine exhaust temperature 1262). Note that the feature vector for generator power did not become abnormal. In order to decide whether or not these signals 1212, 1222, 1232, 1242 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world industrial assets. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 12:
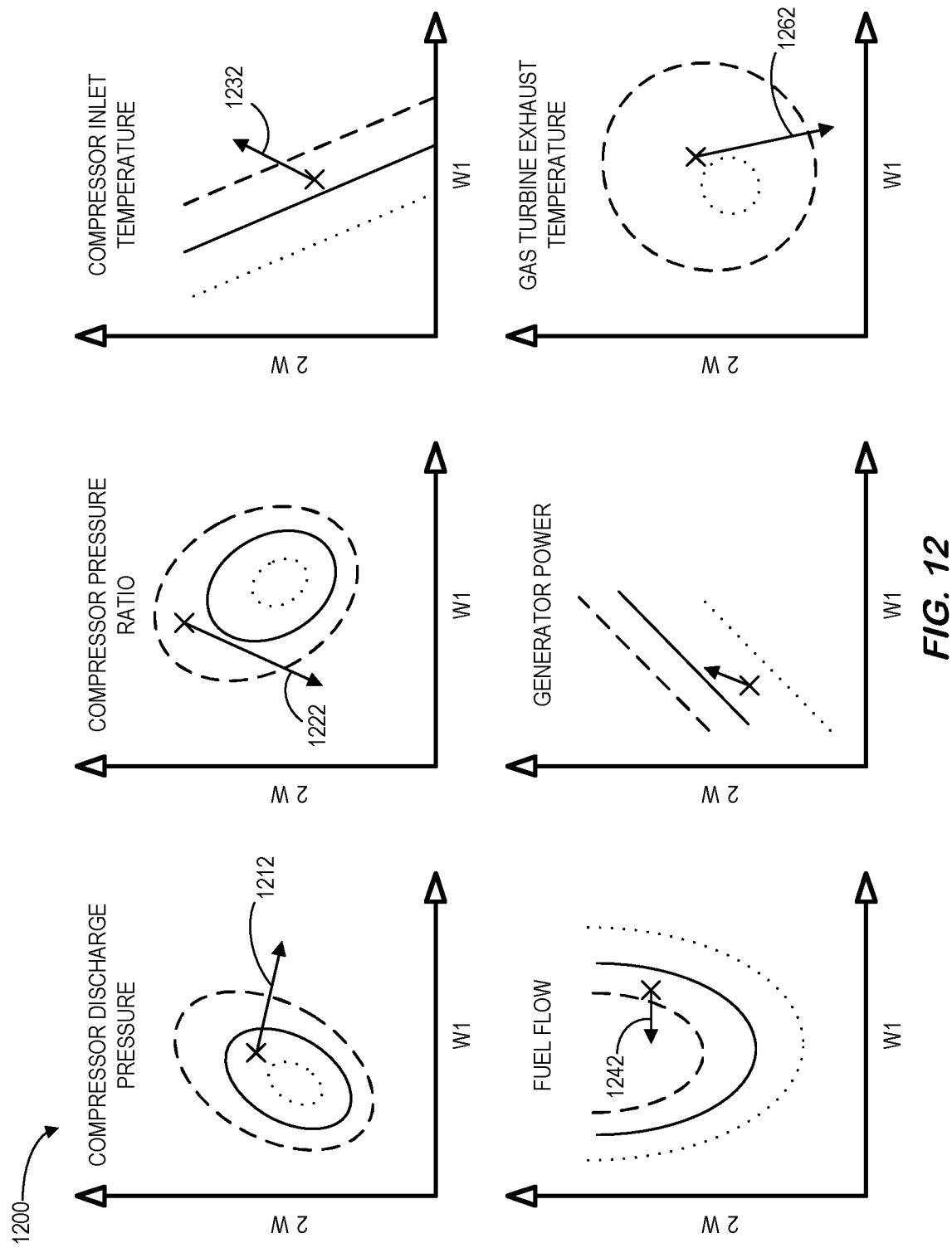

Note that multiple vector properties might be examined, and the information described with respect to FIGS. 10 through 12 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of an industrial asset by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the industrial asset may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the industrial asset to normal operation in a timely fashion.

Thus, some embodiments may provide an advanced anomaly detection algorithm to detect cyber-attacks on, for example, key industrial asset control sensors. The algorithm may identify which signals(s) are being attacked using control signal-specific decision boundaries and may inform an industrial asset to take accommodative actions. In particular, a detection and localization algorithm might detect whether a sensor, auxiliary equipment input signal, control intermediary parameter, or control logical are in a normal or anomalous state. Some examples of industrial asset monitoring nodes that might be analyzed include: critical control sensors; control system intermediary parameters; auxiliary equipment input signals; and/or logical commands to controller.

A cyber-attack detection and localization algorithm may process a real-time industrial asset signal data stream and then compute features (multiple identifiers) which can then be compared to the sensor specific decision boundary. In some embodiments, generating features may involve simply performing an identity transform. That is, the original signal might be used as it is.

Figure 13:
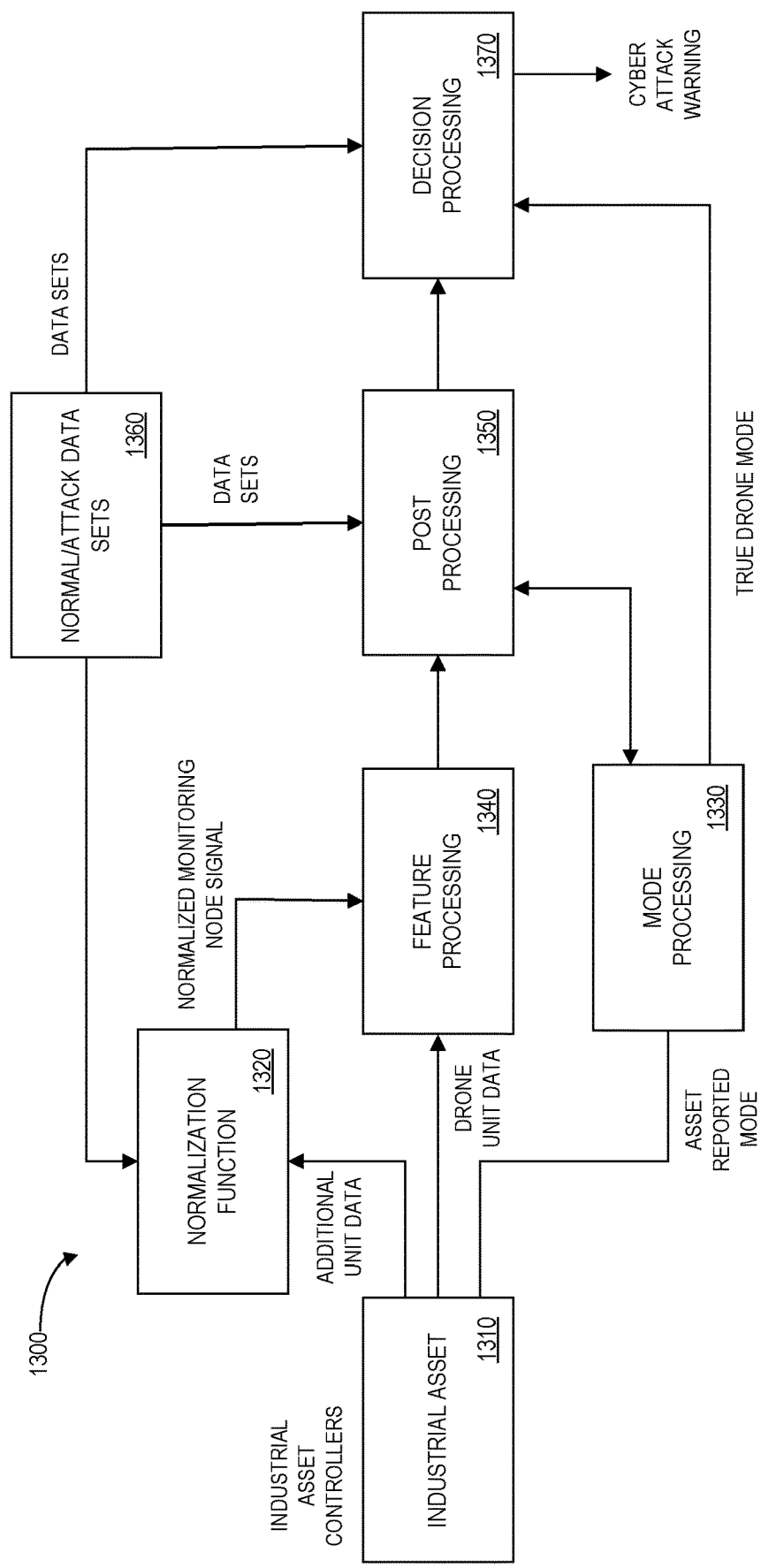
FIG. 13 illustrates a block diagram view of a cyber-attack detection system in accordance with some embodiments.

Note that an industrial asset may be associated with non-linear operations over a range of operating parameters. As a result, data variations can be substantial and determining when a cyber threat is present based on operation of the control system may be difficult. FIG. 13 illustrates a block diagram view of a cyber-attack detection system 1300 in accordance with some embodiments. In particular, the system 1300 illustrates an industrial asset 1310 (e.g., associated with unit controllers) that transmits information about temperature, airflow, etc. to a normalization function 1320. The industrial asset 1310 may also transmit information, to mode processing 1330 (e.g., a reported mode of operation) and feature processing 1340 (e.g., unit data). The normalization function 1320 might, for example, transmit a normalized monitoring node signal to feature processing 1340. Post processing 1350 may receive information from feature processing 1340 and transmit data to decision processing 1370 (which can automatically create a cyber-attack warning based at least in part on data sets received from a normal/attack data sets storage unit 1360).

Figure 14:
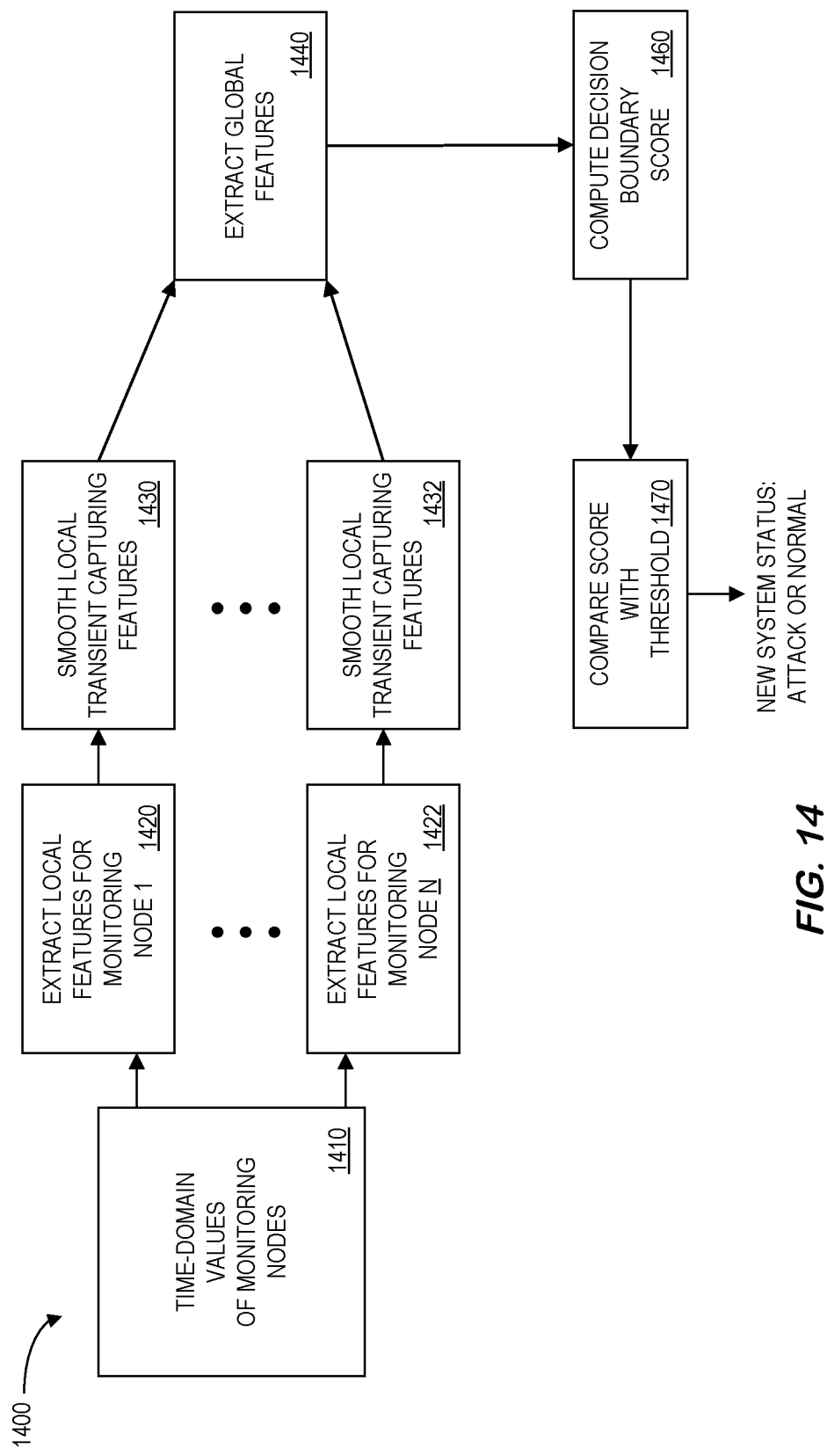
FIG. 14 is a high-level block diagram of a system to protect an industrial asset according to some embodiments.

Some embodiments described herein are directed to challenging problems encountered during rapid transients associated with an industrial asset (e.g., in a rapidly changing environment). For example, FIG. 14 is a high-level block diagram of a system 1400 to protect an industrial asset according to some embodiments. The system 1400 extracts local features for monitoring nodes 1-N 1420, 1422 from time-domain values 1410. The system 1400 then smoothes local transient capturing features for each node 1430, 1432 (e.g., via band-pass filters). The system 1400 may also, according to some embodiments, extract global features 1440 and compute a decision boundary score 1460. The decision boundary score 1860 can then be compared to a threshold value 1470 to determine if the new system status of the industrial asset is "attack" or "normal."

Figure 15:
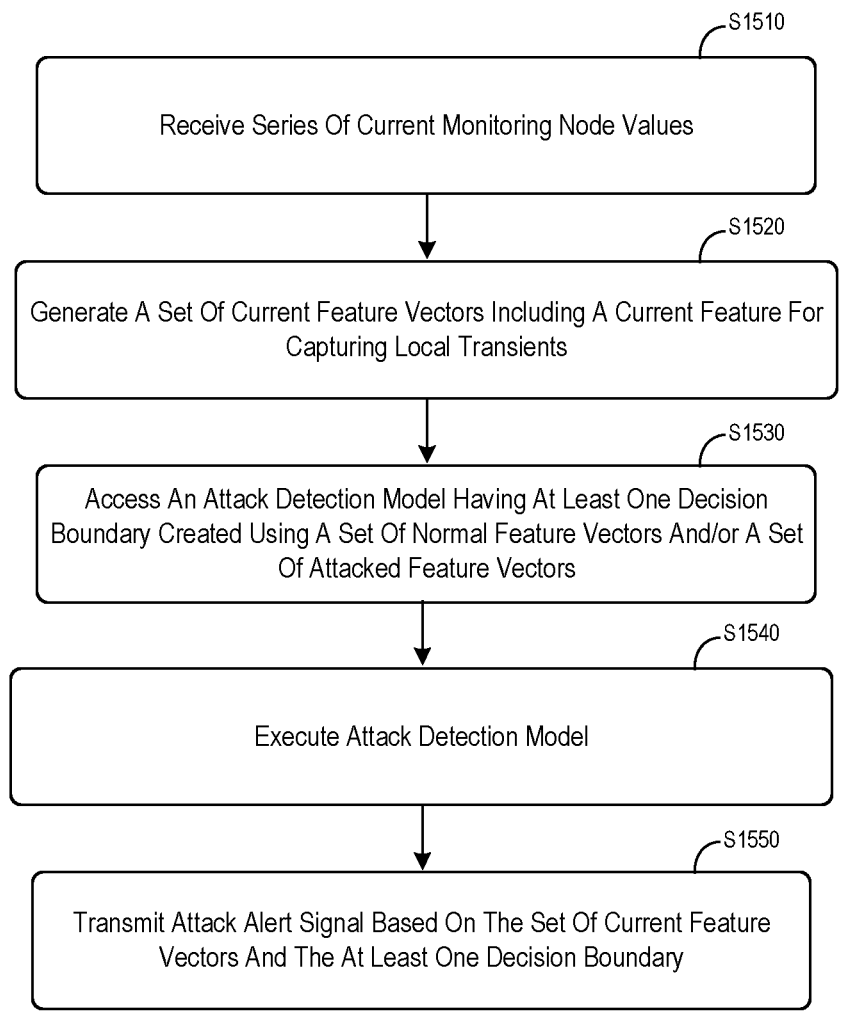
FIG. 15 is a method of protecting an industrial asset in accordance with some embodiments.

FIG. 15 is a method of protecting an industrial asset in accordance with some embodiments. The method may, for example, protect an industrial asset associated with a plurality of monitoring nodes, each generating a series of current monitoring node values over time that represent a current operation of the industrial asset. At S1510, the series of current monitoring node values may be received. At S1520, the system may generate a set of current feature vectors, including a current feature for capturing local transients and/or a current feature for capturing global transients in accordance with any of the embodiments described herein.

At S1530, the system may access an attack detection model having at least one decision boundary created using a set of normal feature vectors and/or a set of attacked feature vectors. The attack detection model may be executed at S1540, and the system may transmit an attack alert signal based on the set of current feature vectors and the at least one decision boundary.

Figure 16:
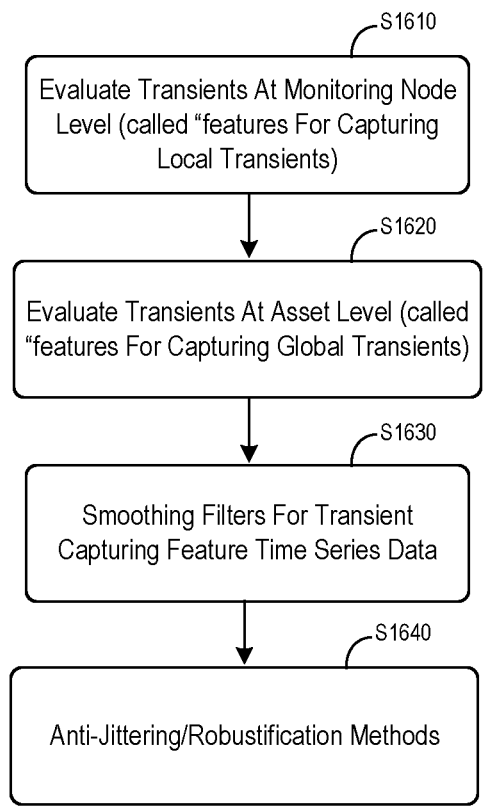
FIG. 16 is a more detailed method of protecting an industrial asset according to some embodiments.

FIG. 16 is a more detailed method of protecting an industrial asset according to some embodiments. At S1610, the system may evaluate transients at the monitoring node level (called 'features for capturing local transients'). At 1620, the system may evaluate transients at asset level (called "features for capturing global transients"). At S1630, smoothing filters may be applied for transient capturing feature time series data. At S1640, anti-jittering (e.g., robustification) methods may be employed in accordance with any of the embodiments described herein.

With respect to key features for capturing local transients, some embodiments may be associated with local transient capturing features of time-domain node values. For example, the local feature vector for each monitoring node might comprise of a set of "base features," which may be of any of the types described herein, augmented by a set of "transient capturing features" that provide, in rapid scale, a sense for the notion of change in the environment. In other words, the transient capturing features may characterize how fast the environment is evolving. In the following, a few types of transient capturing feature types will be described to enable such a distinguishing nature of rapid changes. The following description is for illustration purposes only and the transient capturing features are not limited to these specific types.

Some local transients captures features may be associated with time-derivative local features of the time-domain values. That is, one particular type of transient capturing features might be the time derivate(s) of the monitoring node values. To this end, numerical differentiation can be used with central or backward finite differences. The numerical derivatives may be computed using the last points of the batched data. The number of points needed might be selected based on the order and type of the differentiation method. For example, the first and second derivatives using backward finite difference for monitoring node $x_1$ are:

$$\frac{dx_1}{dt}(t) = \frac{x_1(t) - x_1(t - T_s)}{T_s}$$

$$\frac{d^2 x_1}{dt^2}(t) = \frac{x_1(t) - 2x_1(t - T_s) + x_1(t - 2T_s)}{T_s^2}$$

where $T_s$ is the sampling time. Higher-order derivatives are also possible to compute, but for practical reasons (and depending on how noisy the data is) numerical differentiation beyond first and second derivatives may be impractical. The above computations are simple and low cost, and no additional storage might be required since a batch of time-series data (usually of the length of several $T_s$) may enter the system as each sampling time.

Transit capturing features can also be extracted as the features of the base features, capturing the evolution of the base features for each monitoring node. These are essentially "features of features." For example, time-derivative features of the local base features might be employed. These may be similar to the time-derivative features of the monitoring node values described above, and time-domain derivatives of the base features may also be computed from feature evolution time-series data. For example, if $w_1^1$ is the first local base feature of the first monitoring node $x_1$, then:

$$\frac{dw_1^1}{dt}(t) = \frac{w_1^1(t) - w_1^1(t-T_s)}{T_s}$$

$$\frac{d^2w_1^1}{dt^2}(t) = \frac{w_1^1(t) - 2w_1^1(t-T_s) + w_1^1(t-2T_s)}{T_s^2}$$

Note that, similar to the time-domain values of the monitoring nodes, after the base features are extracted, time-domain values of base features may also be readily available for each sliding batch. Also note that the sampling time, $T_s$, may not be same as the local features of time-domain data. Here again, the computations may be low-cost but additional storage may be needed since they involve features computed from previous batches of data.

Other embodiments might be associated with local "Jacobian features." Local Jacobian features are the partial derivatives of a base feature of a monitoring node with respect to another base feature of the same monitoring node. Suppose the base feature vectors of an example monitoring node $x_1$ are $W^1 = [w_1^1 \ldots w_{f_1}^1]^T$, where $f_1$ is the number of local base features of the monitoring node $x_1$. The Jacobian of vector field $W^1$ with respect to itself, is a matrix with the main diagonal elements being 1:

$$J_{W^1}(W^1) = \begin{bmatrix} 1 & \frac{\partial w_1^1}{\partial w_2^1} & \cdots & \frac{\partial w_1^1}{\partial w_{f_1}^1} \\ \frac{\partial w_2^1}{\partial w_1^1} & 1 & \cdots & \frac{\partial w_2^1}{\partial w_{f_1}^1} \\ \vdots & \vdots & \ddots & \vdots \\ \frac{\partial w_{f_1}^1}{\partial w_1^1} & \frac{\partial w_{f_1}^1}{\partial w_2^1} & \cdots & 1 \end{bmatrix}$$

In this case, the local Jacobian features of $x_1$ are the non-diagonal elements of this matrix. Additionally, the properties of this matrix such as its trace, determinant, eigenvalues, etc. can be considered as local transit capturing features. The partial derivatives can be numerically computed using central or backward finite differences. For example, using backward finite differences:

$$\frac{\partial w_1^1}{\partial w_2^1}(t) = \frac{w_1^1(t) - w_1^1(t-T_s)}{w_2^1(t) - w_2^1(t-T_s)}$$

The local Jacobian features of the base features of other monitoring nodes may be computed in a similar fashion. Having n monitoring nodes each having $f_i$, i=1, ..., n local base features, in general, there exists n of such Jacobian matrices, each having $f_i*(f_i-1)$ time-varying elements.

Still other embodiments may be associated with local Hessian features. The Hessian of a vector field with respect to another vector field (or itself) is a tensor of order three, which can be shown as an array of Hessian matrices of each element of the vector field with respect to the other (or the same) vector field. In this case, for example, the Hessian of a vector field $W^1$ (local base features of monitoring node $x_1$) with respect to itself is:

$$H_{W^1}(w^1) = \{H_{W^1}(w_1^1), H_{W^1}(w_2^1), \ldots, H_{W^1}(w_{f_1}^1)\}$$

For instance, $H_{W^1}(w_1^1)$ is the Hessian of the first local base feature $w_1^1$ with respect to the local base feature vector $W^1$, which is:

$$H_{W^1}(w_1^1) = \begin{bmatrix} 0 & 0 & \cdots & 0 \\ 0 & \frac{\partial^2 w_1^1}{\partial (w_2^1)^2} & \cdots & \frac{\partial^2 w_1^1}{\partial w_2^1 w_{f_1}^1} \\ \vdots & \vdots & \ddots & \vdots \\ 0 & \frac{\partial^2 w_1^1}{\partial w_{f_1}^1 w_2^1} & \cdots & \frac{\partial^2 w_1^1}{\partial (w_{f_1}^1)^2} \end{bmatrix}$$

Note that the first row and first column of this matrix are zero. For monitoring node $x_1$ with $f_1$ local base feature, there are $f_1$ such Hessian matrices. The local Hessian features of node $x_1$ are the non-zero elements of those matrices. The second partial derivate can also be computed numerically using central or backward finite differences. More efficiently, the Hessian matrix may be computed using Hessian Automatic Differentiation ("HAD").

The local features for each monitoring node (e.g., after de-noising) may be stacked to create a global feature vector. The global feature vector may also contain interactive feature involving two or more monitoring nodes, e.g. cross-correlation between two nodes. According to some embodiments, the features may be normalized. The dimension of the global feature vector can then be further reduced using any dimensionality reduction technique such as PCA. Note that the transient capturing features may be left out of such dimensionality reduction. The features may be calculated over a sliding window of the signal time-series. The length of the window and the duration of slide might be determined, for example, from domain knowledge and inspection of the data, detection performance, and computing resources. The interactive global features may also contain global transit capturing features involving two or more nodes.

Global transient capturing features are essentially the partial derivatives of a time-domain values of a monitoring node with respect to other monitoring nodes, or the partial derivatives of the local features of a monitoring node with respect to the local features of other monitoring nodes. According to some embodiments, global transient capturing features of time-domain node values may be utilized, such as a Jacobian feature of the time-domain values of the monitoring nodes. These features may be computed as the first partial derivatives of time-domain values of a monitoring node with respect to another node. For example, suppose there are n monitoring nodes, $X=[x_1, x_2, \ldots, x_n]^T$. The Jacobian of vector field X with respect to itself is:

$$J_X(X) = \begin{bmatrix} 1 & \frac{\partial x_1}{\partial x_2} & \cdots & \frac{\partial x_1}{\partial x_n} \\ \frac{\partial x_2}{\partial x_1} & 1 & \cdots & \frac{\partial x_2}{\partial x_n} \\ \vdots & \vdots & \ddots & \vdots \\ \frac{\partial x_n}{\partial x_1} & \frac{\partial x_n}{\partial x_2} & \cdots & 1 \end{bmatrix}$$

The off-diagonal elements can then be considered as global transit capturing features. The partial derivatives can be computed using central or backward finite differences. For example, using backward finite differences:

$$\frac{\partial x_1}{\partial x_2}(t) = \frac{x_1(t) - x_1(t - T_s)}{x_2(t) - x_2(t - T_s)}$$

Other embodiments may use a Hessian feature of the time-domain values of the monitoring nodes. This is the Hessian of the vector field X with respect to itself, a tensor of order three which is represented by an array of Hessian matrices, similar to the local Hessian features:

$$H_x(X) = \{H_x(x_1), H_x(x_1), \ldots, H_x(x_n)\}$$

For example, for $H_x(x_1)$:

$$H_X(x_1) = \begin{bmatrix} 0 & 0 & \cdots & 0 \\ 0 & \frac{\partial^2 x_1}{\partial (x_2)^2} & \cdots & \frac{\partial^2 x_1}{\partial x_2 x_n} \\ \vdots & \vdots & \ddots & \vdots \\ 0 & \frac{\partial^2 x_1}{\partial x_n x_2} & \cdots & \frac{\partial^2 x_1}{\partial (x_n)^2} \end{bmatrix}$$

Note that there are n of such Hessian matrices, each having $(n-1)^2$ non-zero elements. The Hessian matrix of the measurements of a physical system, satisfies Schwartz condition of continuous partial differentiability and is, therefore, symmetric. Hence, there are $n(n-1)/2$ distinct time-varying elements in each matrix which can be considered as global transit capturing features. Note that each Hessian matrix can then be computed using numerical or automatic differentiation.

Some embodiments may utilize global transient capturing features of the local features. For example, a Jacobian of the local features vector of one node with respect to another. Note that the global Hessian feature of the feature is computed as the second partial derivative of one feature of a mentoring node, with respect to the vector field of the local features of another monitoring node. For instance, the Jacobian of $W^1$ (local base features of monitoring node $x_1$) with respect to the vector field $W^2$ (local base features of monitoring node $x_2$) is a $f_1 * f_2$ matrix:

$$J_{W^2}(W^1) = \begin{bmatrix} \frac{\partial w_1^1}{\partial w_1^2} & \frac{\partial w_1^1}{\partial w_2^2} & \cdots & \frac{\partial w_1^1}{\partial w_{f_2}^2} \\ \frac{\partial w_2^1}{\partial w_1^2} & \frac{\partial w_2^1}{\partial w_2^2} & \cdots & \frac{\partial w_2^1}{\partial w_{f_2}^2} \\ \vdots & \vdots & \ddots & \vdots \\ \frac{\partial w_{f_1}^1}{\partial w_1^2} & \frac{\partial w_{f_1}^1}{\partial w_2^2} & \cdots & \frac{\partial w_{f_1}^1}{\partial w_{f_2}^2} \end{bmatrix}$$

Some embodiments may use a Hessian of the features of one node with respect to another. In this case, a global Hessian feature of the feature may be computed as the second partial derivative of one feature of a mentoring node with respect to the vector field of the local features of another monitoring node. For instance, the Jacobian of $W^1$ (local base features of monitoring node $x_1$) with respect to the vector field $W^2$ (local base features of monitoring node $x_2$):

$$H_{W^2}(W^1) = \{H_{W^2}(w_1^1), H_{W^2}(w_1^2), \ldots, H_{W^w}(w_{f_1}^1)\}$$

where $H_{W^2}(w_1^1)$ is the Hessian of $w_1^1$ (first local feature of node $x_1$) with respect to the vector field $W^2$ (local base features of monitoring node $x_2$). Having n monitoring nodes, the global Hessian feature of features will be the elements of n such tensors (each being an array of matrices).

Note that extracting transient capturing features involves differentiations which is known to be a noise-prone process. In order to de-noise the resulting features, these features may be smoothened at the local and/or global levels. The smoothing filters might comprise, for example, band-pass filters with very a low cut-in frequency (just to filter the fictitious DC value which may exists as an artifact of numerical derivatives) and a cut-off frequency which may be selected by inspecting the power spectral density of the signals. The bandwidth of the filter can be automatically selected to be, for example, the first 5 harmonics of the signal. The order of the filter may be selected by the maximum phase distortion allowed while still capturing the fastest normal transient of the environment. For example, a noise-robust 5-point differentiator can be derived as:

$$\frac{dx}{dt}(t) = \frac{5x(t) + 2x(t - T_s) - 8x(t - 2T_s) - 2x(t - 3T_s) + 3x(t - 4T_s)}{8T_s}$$

Polynomial-based smooth noise-robust filters, such as a Savitzky-Golay smooth differentiation filter, can also be used. According to some embodiments, FFT-based filters with zero-phase distortion can be applied to smoothen transient capturing features. FFT-based filters may transform the feature time series into the frequency domain and then apply a zero-phase band-limited (or low-pass) filter. An inverse FFT can then be performed to obtain a filtered feature time-series data.

During the off-line training phase, normal and abnormal data sets may be generated (including fast transients), and the global feature vectors, including the smoothed transient capturing features, may be extracted to train a classification decision boundary. The classification decision boundary could be based on any classification method, such as Support Vector Machines ("SVM"), K-nearest neighborhood, deep learning neural networks, Extreme Learning Machines ("ELM"), etc. The computed decision boundary can then be pre-stored in the system for real-time operations. It might comprise, for example, a mathematical score function of the global features and a score threshold which determines whether the current system status is normal or abnormal.

Figure 17:
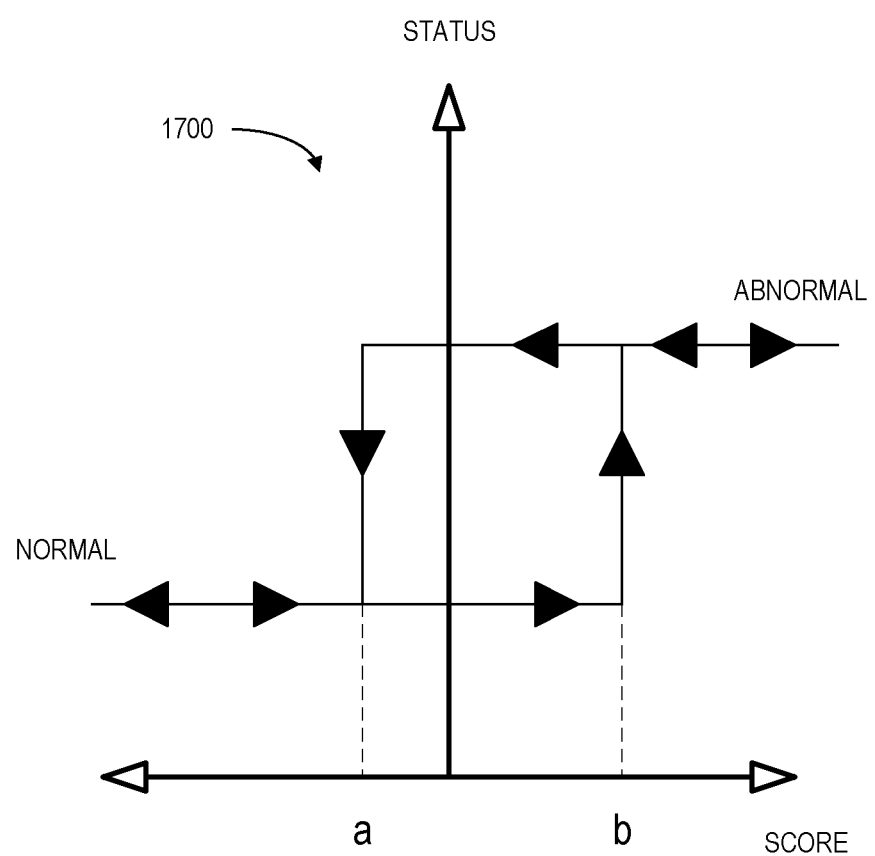
FIG. 17 illustrates an anti jitter process in accordance with some embodiments.

FIG. 17 illustrates an anti jitter process 1700 in accordance with some embodiments. Note that during the real-time operations the classification decision boundary computes a score at each sampling time, which is then compared to a pre-stored score threshold. In order to avoid uttering around the score threshold, which could happen due to the fast-changing nature of the transient capturing features, an anti-jittering hysteresis mechanism may be applied around the threshold. Suppose that the decision boundary is trained such that a negative score resembles "normal" status and a positive score resembles "abnormal" status. Note that a hysteresis function is not necessarily symmetric and can have two different trigger edges a>0 and b<0 as the score threshold (illustrated in FIG. 17).

The system may use the current system status to apply the proper score threshold. If the current status is "normal," it remains "normal" until score>a, at which point the new status becomes "abnormal." If the current status is "abnormal," it remains "abnormal" until score<b, at which point the new status becomes "normal."

The family of transient capturing featuring described here constitutes a large number of features that could be extracted in addition to the base features to create a reliable decision boundary. Any subset of these features, or features of the similar nature, could be used for any particular application. Suppose there are n monitoring nodes, each having $f_i$, i=1, . . . , n local base features. The features of the time-domain node values might include the first derivative, the second derivative, Jacobian information (e.g., determinants, trace, eigenvalues, singular values), Hessian information, etc. The features of the base (local) features might include the first derivative, the second derivative, Jacobian information (e.g., determinants, trace, eigenvalues, singular values), Hessian information, etc.

Current anomaly/threat detection methods do not perform well under system transients and misclassify the transient normal operation as abnormal, causing false alarms during transients. Embodiments described herein may provide a reliable, low-cost, and computationally efficient solution. Some advantages of embodiments described herein include: carrying out cyberattack detection during continuous operational mode (especially during rapid transients such as Dry Low NOx ("DLN") mode transfer in a gas turbine); detection may be more sensitive to fast transients and reduces false positive rate; an analytics application for digital monitoring system, etc.

Embodiments might be tested using various simulations of a gas turbine. For example, an asset may have 20 monitoring nodes, each having 5 local base features, including, median, standard deviation, kurtosis, range, and a moving average. The features may be extracted, for example, over a sliding window of batch data of node measurements of size 50 second, sliding by one sampling time (Ts=1 sec) at each sampling time. In addition, one transient capturing feature might be added, namely the first derivative of the time-domain node values (rate features) as the 6-th local feature for each node. The transient capturing feature for each node might then pass through a 5-degree smoothing filter. At the global level, there may be two interactive features as the correlation of two monitoring nodes used in those features. The global feature vector might be comprised of 122 features (6 local per node plus 2 global interactive). Then a classification decision boundary could be trained based on ELM neural networks using "normal" and "abnormal" data sets collected by simulating a high-fidelity model of the asset. The "normal" data set might be created by Pseudo-Random Binary Sequence ("PRBS") excitation to resemble different operational conditions, and the "abnormal" data set might be created by DoE. The features can then be extracted over a sliding window of the time-series data. The training data set might comprise, for example, over 2 million data points, each being a vector of size 122, in the feature space. The ELM training code is implemented efficiently, using sparse matrix manipulations, to be able to handle the big data. To resemble real operations, the simulations may be done in close-loop with the gas turbine controller in the loop. The results may then be compared with the results of another classification decision boundary (using the same classification methods and same data sets) in which only base features are used (no transient capturing features included) as the base-line. The performance of the reliable cyber-threat detection system in various test scenarios may not create false alarms during rapid normal transients and DLN mode transfers, while still detecting attacks even faster than the base-line classifier. The transient capturing features may improve both sensitivity and accuracy of the detection system. Moreover, the reliable system may be computationally low-cost and not add a noticeable demand to real-time computational needs.

Figure 18:
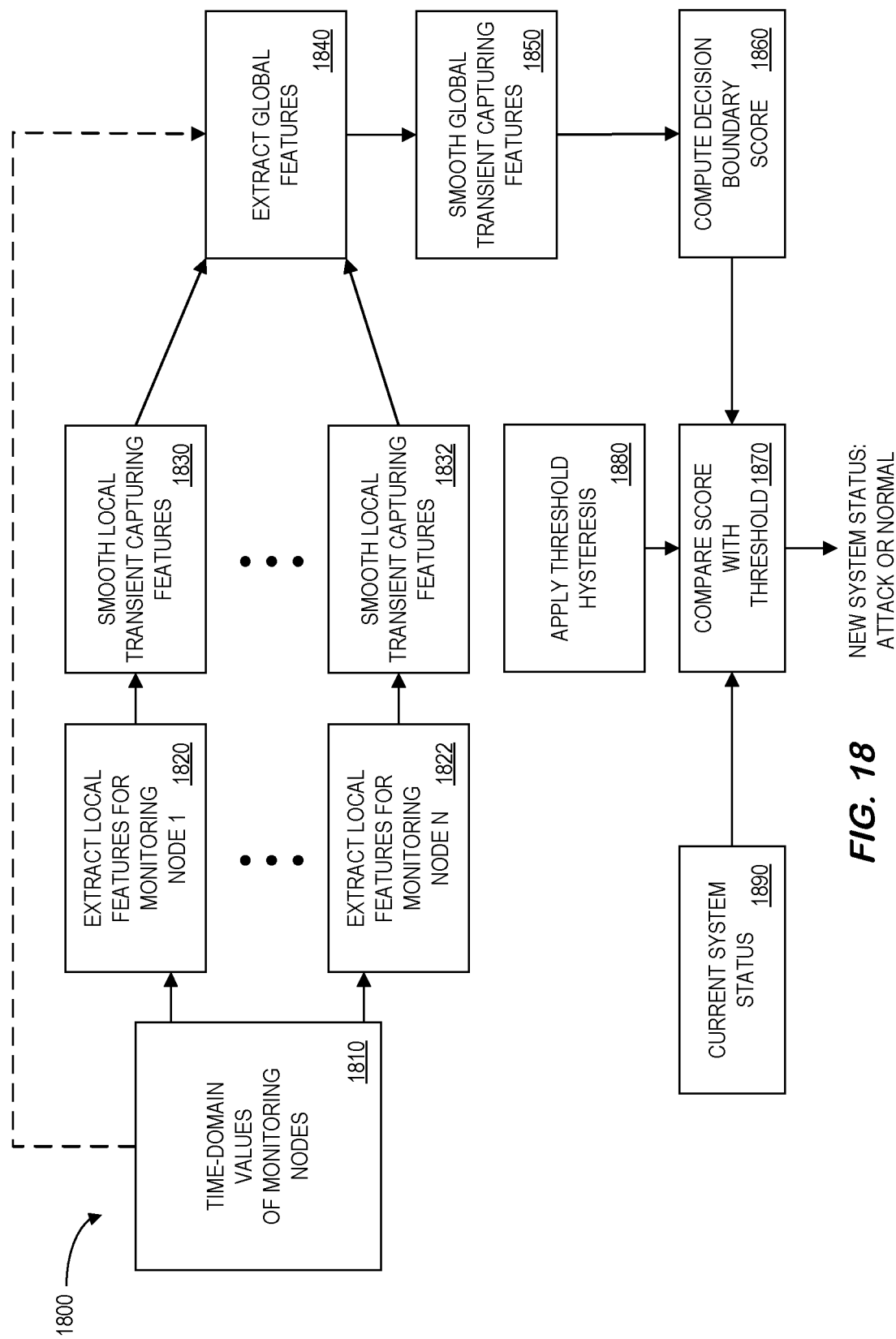
FIG. 18 is a more detailed architecture of a system to protect an industrial asset according to some embodiments.

FIG. 18 is a more detailed architecture of a system 1800 to protect an industrial asset according to some embodiments. The system 1800 extracts local features for monitoring nodes 1-N 1820, 1822 from time-domain values 1810. The system 1800 then smoothes local transient capturing features for each node 1830, 1832. The system 1800 may also, according to some embodiments, extract global features 1840, smooth the global transient capturing features 1850, and compute a decision boundary score 1860. According to some embodiments, the extraction of global features 1840 may also utilize the time-domain values of monitoring nodes 1810 (e.g., to allow cross-correlation as illustrated by the dashed arrow in FIG. 18). The decision boundary score can then be compared 1870 to a threshold value 1870 based on an applied threshold hysteresis 1880 and a current system status 1890 to determine if the new system status of the industrial asset is "attack" or "normal."

Figure 19:
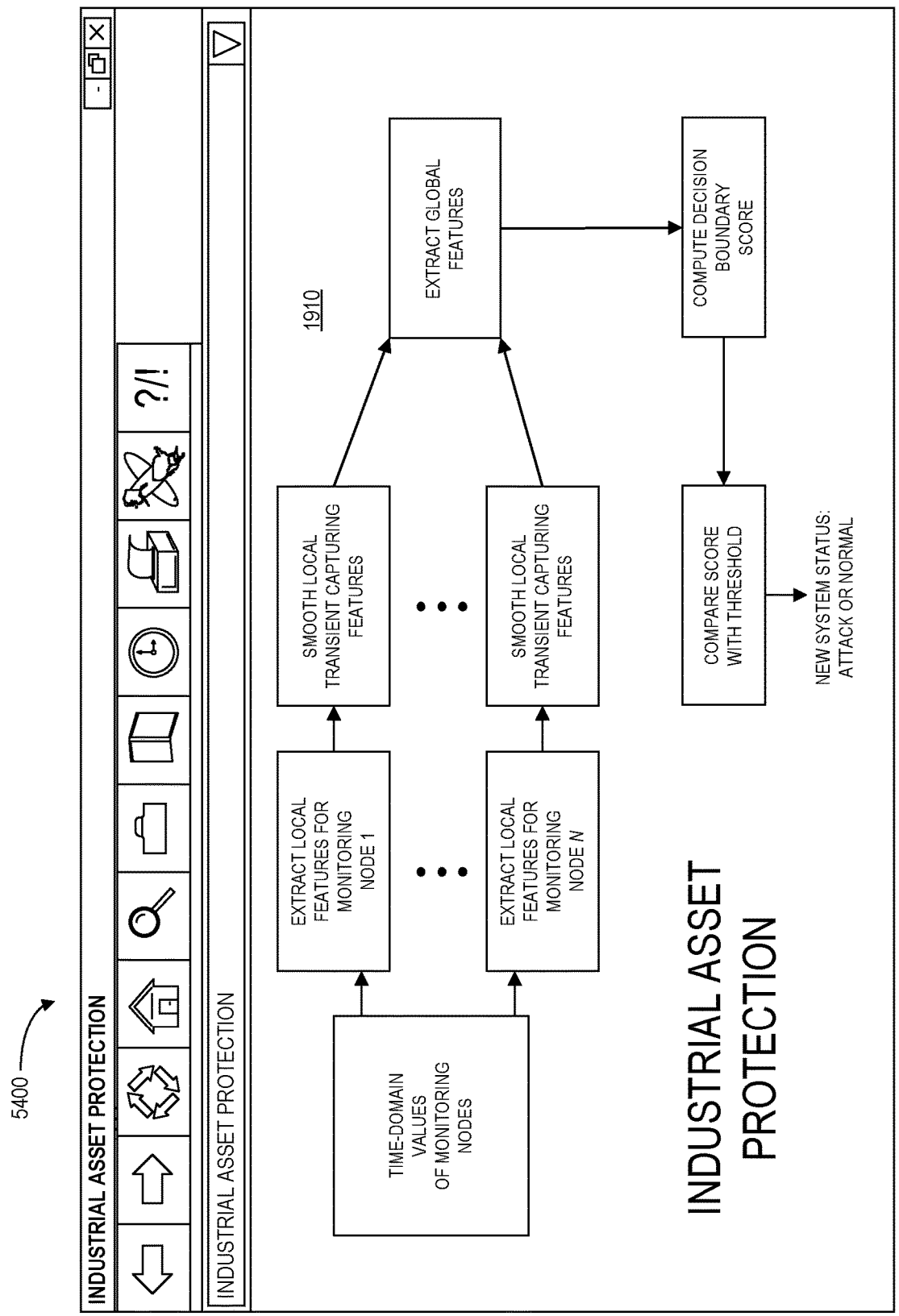
FIG. 19 is an industrial asset protection system display in accordance with some embodiments.
Figure 20:
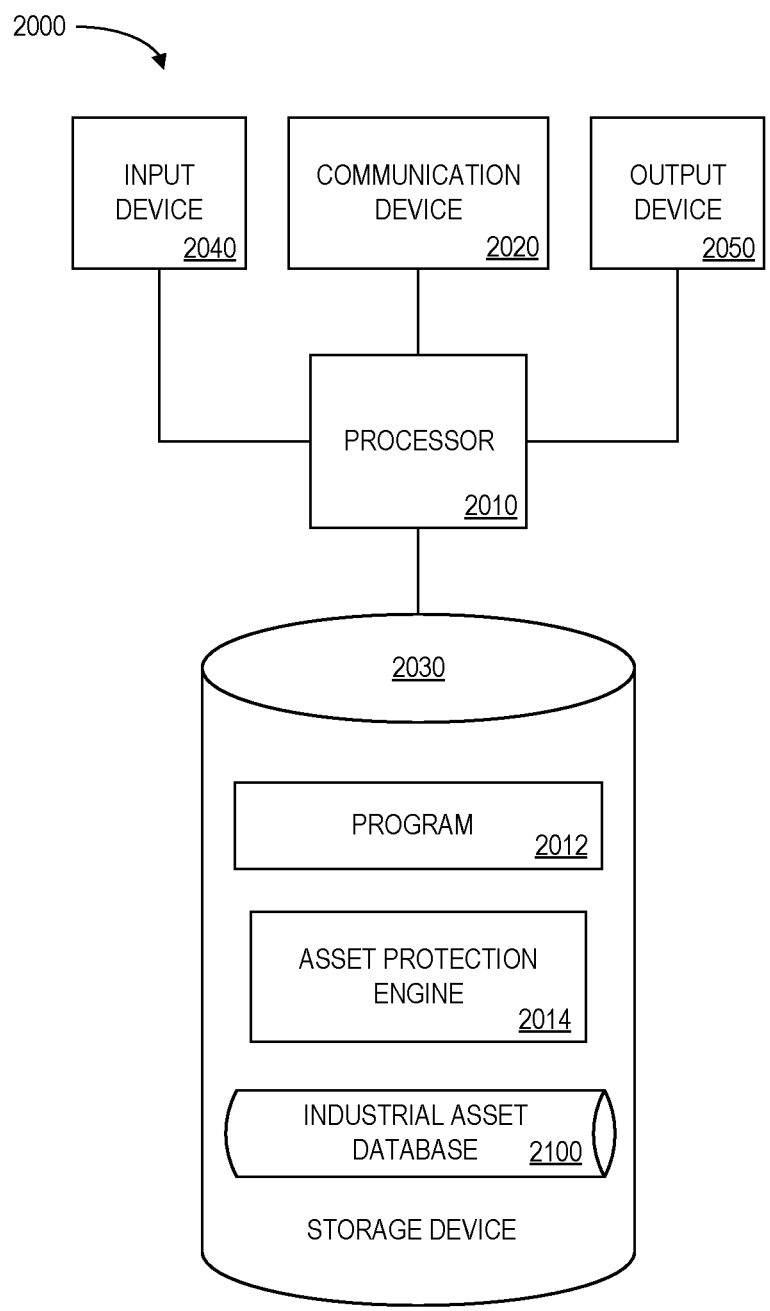
FIG. 20 is an industrial asset protection platform according to some embodiments.

FIG. 19 is an example of an industrial asset protection display 1900 that might be used, for example, to provide a graphical depiction 1910 to an operator and/or to provide an interactive interface allowing an operator to adjust system components as appropriate. Selection of an item on the display 1900 (e.g., via a touchscreen or computer mouse points) may let the operator see more information about that particular item and/or adjust operation of that item (e.g., by altering how global features are extracted). Note that the embodiments described herein may be implemented using any number of different hardware configurations. For example, FIG. 20 is a block diagram of an industrial asset protection platform 2000 that may be, for example, associated with the system 100 of FIG. 1 and/or any other system described herein. The industrial asset protection platform 2000 comprises a processor 2010, such as one or more commercially available Central Processing Units ("CPUs") in the form of one-chip microprocessors, coupled to a communication device 2060 configured to communicate via a communication network (not shown in FIG. 20). The communication device 2060 may be used to communicate, for example, with one or more remote monitoring nodes, user platforms, digital twins, etc. The industrial asset protection platform 2000 further includes an input device 2040 (e.g., a computer mouse and/or keyboard to input industrial asset and/or predictive modeling information) and/an output device 2050 (e.g., a computer monitor to render a display, provide alerts, transmit recommendations, and/or create reports). According to some embodiments, a mobile device, monitoring physical system, and/or PC may be used to exchange information with the industrial asset protection platform 2000.

The processor 2010 also communicates with a storage device 2030. The storage device 2030 may comprise any appropriate information storage device, including combinations of magnetic storage devices (e.g., a hard disk drive), optical storage devices, mobile telephones, and/or semiconductor memory devices. The storage device 2030 stores a program 2012 and/or an asset protection engine 2014 for controlling the processor 2010. The processor 2010 performs instructions of the programs 2012, 2014, and thereby operates in accordance with any of the embodiments described herein. For example, the processor 2010 may receive a series of current monitoring node values and generate a set of current feature vectors including a current feature for capturing transients (e.g., local transients and/or global transients). The processor 2010 may also access an attack detection model having at least one decision boundary that was created using at least one of a set of normal feature vectors and/or a set of attacked feature vectors. The attack detection model may then be executed by the processor such that an attack alert signal is transmitted, when appropriate, based on the set of current feature vectors (including the current feature to capture transients) and the at least one decision boundary.

The programs 2012, 2014 may be stored in a compressed, uncompiled and/or encrypted format. The programs 2012, 2014 may furthermore include other program elements, such as an operating system, clipboard application, a database management system, and/or device drivers used by the processor 2010 to interface with peripheral devices.

As used herein, information may be "received" by or "transmitted" to, for example: (i) the industrial asset protection platform 2000 from another device; or (ii) a software application or module within the industrial asset protection platform 2000 from another software application, module, or any other source.

In some embodiments (such as the one shown in FIG. 20), the storage device 2030 further stores an industrial asset database 2100. An example of a database that may be used in connection with the industrial asset protection platform 2000 will now be described in detail with respect to FIG. 21. Note that the database described herein is only one example, and additional and/or different information may be stored therein. Moreover, various databases might be split or combined in accordance with any of the embodiments described herein.

Referring to FIG. 21, a table is shown that represents the industrial asset database 2100 that may be stored at the industrial asset protection platform 2000 according to some embodiments. The table may include, for example, entries identifying industrial assets to be protected. The table may also define fields 2102, 2104, 2106, 2108, 2110, 2112 for each of the entries. The fields 2102, 2104, 2106, 2108, 2110, 2112 may, according to some embodiments, specify: an industrial asset identifier 2102, an industrial asset description 2104, feature to capture transient 2106, a type 2108, a description 2110, and a status 2112. The industrial asset database 2100 may be created and updated, for example, when a new physical system is monitored or modeled, an attack is detected, etc.

The industrial asset identifier 2102 and description 2104 may define a particular asset or system that will be protected. The feature to capture transients 2106 might be a unique alphanumeric code identifying a feature in accordance with any of the embodiments described herein. The type 2108 might indicate if that feature is local or global and the description might further categorize the feature (e.g., as derivative, Jacobian, Hessian, etc.). The status 2112 might indicate, for example, whether the associated monitoring node is operating normally or is currently undergoing a cyber-attack.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbines, any of the embodiments described herein could be applied to other types of industrial assets including power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
a plurality of monitoring nodes each generating a series of current monitoring node values over time that represent a current operation of the industrial asset; and
an attack detection computer platform, coupled to the plurality of monitoring nodes, to:
receive the series of current monitoring node values and generate a set of current feature vectors including a set of base features and a current feature for capturing local transients and a current feature for capturing global transients, wherein the current features for capturing the local transients and the global transients characterize rapid changes in an environment, and wherein the current features are based on time-derivative features or partial-derivative features of one or more base features of the set of base features;
access an attack detection model having at least one decision boundary created using at least one of a set of normal feature vectors and a set of attacked feature vectors, and
execute the attack detection model and transmit an attack alert signal based on the set of current feature vectors and the at least one decision boundary.

2. The system of claim 1, wherein the current feature for capturing the local transients captures local transients at a monitoring node level.

3. The system of claim 2, wherein local transients are captured based on a time-derivative local features of time-domain values from a monitoring node.

4. The system of claim 2, wherein local transients are captured based on a time-derivative features of local base features.

5. The system of claim 2, wherein local transients are captured based on local Jacobian features representing partial derivatives of a base feature of a monitoring node with respect to another base feature of the same monitoring node.

6. The system of claim 2, wherein local transients are captured based on local Hessian features of a vector field with respect to another vector field or itself.

7. The system of claim 1, wherein the current feature for capturing the global transients captures global transients at an industrial asset level.

8. The system of claim 7, wherein global transients are captured based on time-derivative features of time-domain values from a monitoring node.

9. The system of claim 7, wherein global transients are captured based on Jacobian features representing a first partial derivative of time-domain values of a monitoring node with respect to another monitoring node.

10. The system of claim 7, wherein global transients are captured based on global Hessian features of time-domain values of a monitoring node.

11. The system of claim 7, wherein global transients are captured based on features of local transient features.

12. The system of claim 11, wherein global transients are captured based on a Jacobian feature representing the Jacobian of a local feature vector of one monitoring node with respect to another monitoring node.

13. The system of claim 11, wherein global transients are captured based on a Hessian feature representing the Hessian of a local feature vector of one monitoring node with respect to another monitoring node.

14. The system of claim 1, wherein the attack detection computer platform is further to:
apply at least one smoothing filter to time series data used to generate the current features for capturing the local transients and the global transients.

15. The system of claim 14, wherein the smoothing filter is applied at the local level and/or the global level.

16. The system of claim 15, wherein the smoothing filter comprises a band pass filter with a substantially low cut-in frequency and a cut-off frequency selected based on a power spectral density.

17. The system of claim 1, wherein the attack detection computer platform is further to;
apply an anti-jittering process in connection with the attack detection model.

18. A method to protect an industrial asset associated with a plurality of monitoring nodes, each generating a series of current monitoring node values over time that represent a current operation of the industrial asset, comprising:
receiving the series of current monitoring node values;
generating a set of current feature vectors including a set of base features and a current feature for capturing local transients and a current feature for capturing global transients, wherein the current features for capturing the local transients and the global transients characterize rapid changes in an environment, and wherein the current features are based on time-derivative features or partial-derivative features of one or more base features of the set of base features;
accessing an attack detection model having at least one decision boundary created using a set of normal feature vectors and/or a set of attacked feature vectors;
executing the attack detection model; and
transmitting an attack alert signal based on the set of current feature vectors and the at least one decision boundary.

19. The method of claim 18, further comprising:
applying at least one smoothing filter to time series data used to generate the current features for capturing the local transients and the global transients.

20. The method of claim 19, wherein the smoothing filter is applied at the local level and/or the global level and comprises a band pass filter with a substantially low cut-in frequency and a cut-off frequency selected based on a power spectral density.

21. The method of claim 19, further comprising:
applying an anti-jittering process in connection with the attack detection model.

* * * * *